United States Patent
Osada et al.

(10) Patent No.: US 8,029,909 B2
(45) Date of Patent: Oct. 4, 2011

(54) MULTILAYER FILM

(75) Inventors: Shunichi Osada, Shiga (JP); Hitomi Horiuchi, Shiga (JP)

(73) Assignee: Toray Industries, Inc., Tokyo (JP)

( * ) Notice: Subject to any disclaimer, the term of this patent is extended or adjusted under 35 U.S.C. 154(b) by 122 days.

(21) Appl. No.: 10/594,593

(22) PCT Filed: Mar. 28, 2005

(86) PCT No.: PCT/JP2005/005678
§ 371 (c)(1),
(2), (4) Date: Dec. 19, 2006

(87) PCT Pub. No.: WO2005/095097
PCT Pub. Date: Oct. 13, 2005

(65) Prior Publication Data
US 2007/0224434 A1    Sep. 27, 2007

(30) Foreign Application Priority Data

Mar. 31, 2004    (JP) ................................. 2004-104696
Jul. 7, 2004    (JP) ................................. 2004-200156

(51) Int. Cl.
*B32B 27/36* (2006.01)
*B32B 7/02* (2006.01)

(52) U.S. Cl. ......................... 428/480; 428/213; 428/220

(58) Field of Classification Search ............... 428/411.1, 428/480, 213, 220; 385/131, 141
See application file for complete search history.

(56) References Cited

U.S. PATENT DOCUMENTS

| | | | | |
|---|---|---|---|---|
| 5,360,659 | A * | 11/1994 | Arends et al. | ................. 428/216 |
| 5,389,324 | A * | 2/1995 | Lewis et al. | ............... 264/173.12 |
| 6,025,897 | A * | 2/2000 | Weber et al. | .................... 349/96 |
| 2001/0019182 | A1 * | 9/2001 | Hebrink et al. | ................. 264/1.6 |

FOREIGN PATENT DOCUMENTS

| | | |
|---|---|---|
| JP | 2002-160339 A | 6/2002 |
| JP | 2003-075920 A | 3/2003 |
| JP | 2004-338390 A | 12/2004 |
| JP | 2005-142105 A | 6/2005 |

* cited by examiner

*Primary Examiner* — David Sample
*Assistant Examiner* — Prashant J Khatri
(74) *Attorney, Agent, or Firm* — Birch, Stewart, Kolasch & Birch, LLP

(57) ABSTRACT

A multilayer film of which the optical properties hardly change due to heat and where detachment hardly occurs between layers is provided. The multilayer film has a structure where five or more layers made of thermoplastic resin A (layers A) and five or more layers made of thermoplastic resin B (layers B) having a basic skeleton that is the same as that of thermoplastic resin A are alternately layered on top of each other, and is wherein at least one reflection peak is provided and the difference between the reflectance of the reflection peak before heating and after heating for 30 minutes in an atmosphere of 150° C. is no greater than 15%.

34 Claims, 5 Drawing Sheets

(b)

(c)

(a)  (d)  (e)

ved. In addition, when such a multilayer film is used as a filter or a reflective plate, a problem arises even in the environment for practical use where the performance of the filter is lowered

MULTILAYER FILM

TECHNICAL FIELD

The present invention relates to a multilayer film where at least two types of layers made of thermoplastic resin are layered.

BACKGROUND TECHNOLOGY

Various types of films where multiple layers of thermoplastic resin are layered have been proposed and are used, for example, in order to prevent glass from being broken and greatly scattered by pasting a multilayer film having excellent anti-tearing properties to the surface of the glass (Japanese Unexamined Patent Publication H6 (1994)-190995 (page 2), Japanese Unexamined Patent Publication H6 (1994)-190997 (page 2) and Japanese Unexamined Patent Publication H10 (1998)-76620 (page 2)).

In addition, there exist films where multiple resin layers having different indices of refraction are alternately layered, and thereby, a particular wavelength is selectively reflected (Japanese Unexamined Patent Publication H3 (1991)-41401 (page 2), Japanese Unexamined Patent Publication H4 (1992)-29.5804 (page 2) and Japanese Translation of International Unexamined Patent Publication H9 (1997)-506837 (page 2)). From among these, films which selectively reflect a particular wavelength work as a filter for transmitting or reflecting particular light are used as a film for backlight of, for example, a liquid crystal display.

DISCLOSURE OF THE INVENTION

Problem to Be Solved by the Invention

A film for selectively reflecting a particular wavelength according to the prior art, however, contracts greatly due to the thermal hysteresis, and the orientation and crystallinity of the resin that forms the multilayer film vary, and therefore, it is easy for reflective performance to change greatly. Therefore, a process is carried out at a high temperature in order to form performance layers, such as an adhesive layer, a color compensating layer, an electromagnetic wave shielding layer, a hard coat layer, a vapor deposited layer and a reflection preventing layer on the surface of the multilayer film, and thus, a problem arises where the optical performance is lowered and there is inconsistency in the optical properties. In addition, when such a multilayer film is used as a filter or a reflective plate, a problem arises even in the environment for practical use where the performance of the filter is lowered and the color tone changes due to the heat emitted from a peripheral apparatus. In addition, even in the case where change in the optical properties resulting from application of heat or passing of time can be reduced according to the prior art, a problem arises where detachment between layers very easily occurs.

In view of the above described problems in the prior art, an object of the present invention is to provide a film where there is no change in the optical properties resulting from application of heat or passing of time, and detachment between layers hardly occurs.

Means for Solving Problem

The present invention has any of the following configurations:

(1) a multilayer film, which has a structure where five or more layers made of thermoplastic resin A (layers A) and five or more layers made of thermoplastic resin B (layers B) having a basic skeleton that is the same as that of thermoplastic resin A are alternately layered on top of each other, characterized in that at least one reflection peak is provided and the difference between the reflectance of the reflection peak before heating and after heating for 30 minutes in an atmosphere of 150° C. is no greater than 15%;

(2) the multilayer film described in (1), characterized in that the total number of layers A and layers B is no less than 250 and the squared value of the correlation coefficient when each order number of layers B from one of the surface layers of the film and the thickness of the layer are linearly approximated is no less than 0.4 and no greater than 1;

(3) the multilayer film described in (1), characterized in that the total number of layers A and layers B is no less than 250 and the squared value of the correlation coefficient when each order number of layers B from one of the surface layers of the film and the thickness of the layer are approximated in a quadratic polynomial is no less than 0.4 and no greater than 1;

(4) the multilayer film described in any of (1) to (3), characterized in that the total number of layers A and layers B is no less than 640;

(5) the multilayer film described in any of (1) to (4), characterized in that the layer unevenness M in layers B which is found in the following form is no greater than 20%:

$M = s/a \times 100$ where M is the layer unevenness in layers B (%), s is the standard deviation for layers B (nm) and a is the average thickness of layers B (nm);

(6) the multilayer film described in any of (1) to (5), characterized in that the thickness (nm) of at least one layer from among the layers A that form the film is within a range from XA1 to XA2 shown in the following formula and the number of layers A which are included in this range is no less than $50 \times (XA2/XA1)^2$ when the ratio in the thickness of a layer A to an adjacent layer B (thickness of layer A/thickness of layer B) is Z, the lowest wavelength end is λ1 and the highest wavelength end is λ2 in the reflection peak on the highest wavelength side where the reflectance is no less than 30%:

$XA1 = \lambda 1/(3.2 \times (1+Z))$ and $XA2 = \lambda 2/(3.2 \times (1+Z))$ (7) the multilayer film described in any of (1) to (6), characterized by having a reflection peak of which the reflectance is no less than 80%;

(8) the multilayer film described in any of (1) to (7), characterized in that the thicknesses of layers B (nm) at least include a thickness in the range from XB1 to XB2 shown in the following formula and the number of layers B which are included in this range is no less than $50 \times (XB2/XB1)^2$:

$XB1 = Z \times XA1$ $XB2 = Z \times XA2$ (9) the multilayer film described in any of (1) to (8), characterized by including a portion where the thicknesses of layers A and/or the thicknesses of layers B gradually change from XA1 to XA2 and/or gradually change from XB1 to XB2 from the surface side of the film toward the opposite surface side;

(10) the multilayer film described in any of (1) to (9), characterized in that the thicknesses of layers A and/or the thicknesses of layers B change from the surface side of the film toward the opposite surface side in such a manner that the thickness is essentially smaller on the surface side and the thickness is greater close to the center portion in the cross section of the film;

(11) the multilayer film described in any of (1) to (10), characterized in that the thicknesses of layers A and/or the thicknesses of layers B change from the surface side of the film toward the opposite surface side in such a manner that the thickness is essentially greater on the surface side and the thickness is smaller close to the center portion in the cross section of the film;

(12) the multilayer film described in any of (1) to (11), characterized in that thickness ratio Z of a layer A to an adjacent layer B is no less than 0.8 and no greater than 5;

(13) the multilayer film described in any of (1) to (12), characterized by having at least one high order reflective band of which the reflectance is no greater than 30%;

(14) the multilayer film described in any of (1) to (13), characterized in that the order of the high order reflective band of which the reflectance is no greater than 30% is secondary or lower and quaternary or higher;

(15) the multilayer film described in any of (1) to (14), characterized in that the difference in reflectance between the peaks of reflection in different locations in the direction of the width of the film is within ±10%;

(16) the multilayer film described in any of (1) to (15), characterized in that the difference in reflectance between secondary reflective bands in different locations in the direction of the width of the film is within ±5%;

(17) the multilayer film described in any of (1) to (16), characterized in that the thermoplastic resin is polyester and either thermoplastic resin A or thermoplastic resin B includes a polyester with which at least aliphatic dicarbxylic acid or a derivative thereof is copolymerized;

(18) the multilayer film described in any of (1) to (17), characterized in that thermoplastic resin A is made of polyethylene terephthalate and thermoplastic resin B is made of a polyester with which at least cyclohexane dimethanol is copolymerized;

(19) the multilayer film described in any of (1) to (18), characterized in that the peak of heat emission is no less than 0 J/g and no greater than 5 J/g in DSC measurement (first heating);

(20) the multilayer film described in any of (1) to (19), characterized by having a layer of which the thickness is no less than 3 μm and of which the main component is polyethylene terephthalate on at least one side;

(21) the multilayer film described in any of (1) to (20), characterized by having a layer made of an adhesive layer of which the thickness is no less than 30 nm and no greater than 300 nm, and a polyethylene terephthalate layer of which the thickness is no less than 3 μm on at least one side;

(22) the multilayer film described in any of (1) to (21), characterized in that layers other than the outermost layers substantially do not include particles of which the average particle diameter is no less than 20 nm and no greater than 20 μm;

(23) the multilayer film described in any of (1) to (22), characterized in that the number of scratches of which the width is no less than 20 μm is no greater than 20/m$^2$;

(24) the multilayer film described in any of (1) to (17), characterized in that the thickness of the multilayer film periodically varies in the longitudinal direction or direction of the width of the film;

(25) the multilayer film described in any of (1) to (24), characterized in that color development in the multilayer film periodically changes within the surface;

(26) the multilayer film described in any of (1) to (25), characterized in that one or more peaks of which the intensity is 0.04 to 25 in the wave number of 0.5 to 100000 (1/m) in the spectrum when the fluctuation in the thickness of the film is Fourier analyzed;

(27) a decorative film using the multilayer film described in any of (1) to (26);

(28) an anti-counterfeit film using the multilayer film described in any of (1) to (26);

(29) an optical filter using the multilayer film described in any of (1) to (23);

(30) a hologram using the multilayer film described in any of (1) to (26);

(31) a filter for PDP using the multilayer film described in any of (1) to (23);

(32) a reflector for a solar battery, characterized by being made of the multilayer film described in any of (1) to (23);

(33) the reflector for a solar battery described in (32), characterized by having a reflective band of which the reflectance is no less than 80% in a range from 300 nm to 2500 nm;

(34) the reflector for a solar battery described in (32) or (33), characterized in that the vapor transmissivity is no greater than 2 g/(m$^2$·day);

(35) the reflector for a solar battery described in any of (32) to (34), characterized in that resistance to hydrolysis is no less than 1000 hours at 85° C. with a humidity of 85%;

(36) the reflector for a solar battery described in any of (32) to (35), characterized by being made of a multilayer film of which the strength against tearing is no less than 6 N/mm in the longitudinal and the direction of the width; and

(37) the reflector for a solar battery described in any of (32) to (36), characterized by having an absorption band in a wavelength of no greater than 400 nm.

Effects of the Invention

The multilayer film according to the present invention has the above described configuration, and thereby, there is no change in the optical properties resulting from application of heat or passing of time, and detachment between layers hardly occurs.

In addition, the total number of layers A and layers B is no less than 250, and the squared value of the correlation coefficient when the order number of layers B and the thickness of the layers are linearly approximated is no less than 0.4 and no greater than 1, and therefore, the reflectance is high, there is almost no distribution in the reflectance within the peak of reflection and a sharp wavelength cut becomes possible.

In addition, the total number of layers A and layers B is no less than 250, and the squared value of the correlation coefficient when the order number of layers B and the thickness of the layers are approximated in a quadratic polynomial is no less than 0.4 and no greater than 1, and therefore, there is even less distribution in the reflectance within the peak of reflection.

In addition, layer unevenness M in layers B that is found using the following formula is no greater than 20%, and therefore, the width of the band in the peak of reflection becomes narrow.

$$M = s/a \times 100$$

where M is the layer unevenness in layers B (%), s is the standard deviation for layers B (nm) and a is the average layer thickness of layers B (nm).

In addition, the order of the high order reflective band of which the reflectance is no greater than 30% is secondary or lower and quaternary or higher, and therefore, a problem with colorless films designed to reflect near infrared radiation, such that the film actually appears to be colored due to high order reflection, and a problem with films for reflecting visible light, such that the purity of color in the reflective film is low and ultraviolet rays are reflected as a result of high order reflection, and therefore, deterioration in the peripheral member accelerates when the film is used as a filter or the like, hardly occur.

In addition, the difference in the reflectance at the peak of reflection in different locations in the direction of the width of the film is within ±10%, and therefore, the film can be used in a large area.

In addition, the number of scratches having a width of no less than 20 μm is no greater than 20/m$^2$, and therefore, the yield is high and the productivity is excellent.

In addition, the thickness of the multilayer film periodically varies in the longitudinal direction or in the direction of the width of the film, and therefore, the multilayer film has an unprecedented design, where the color periodically changes.

EXPLANATION OF SYMBOLS

Figure 1:
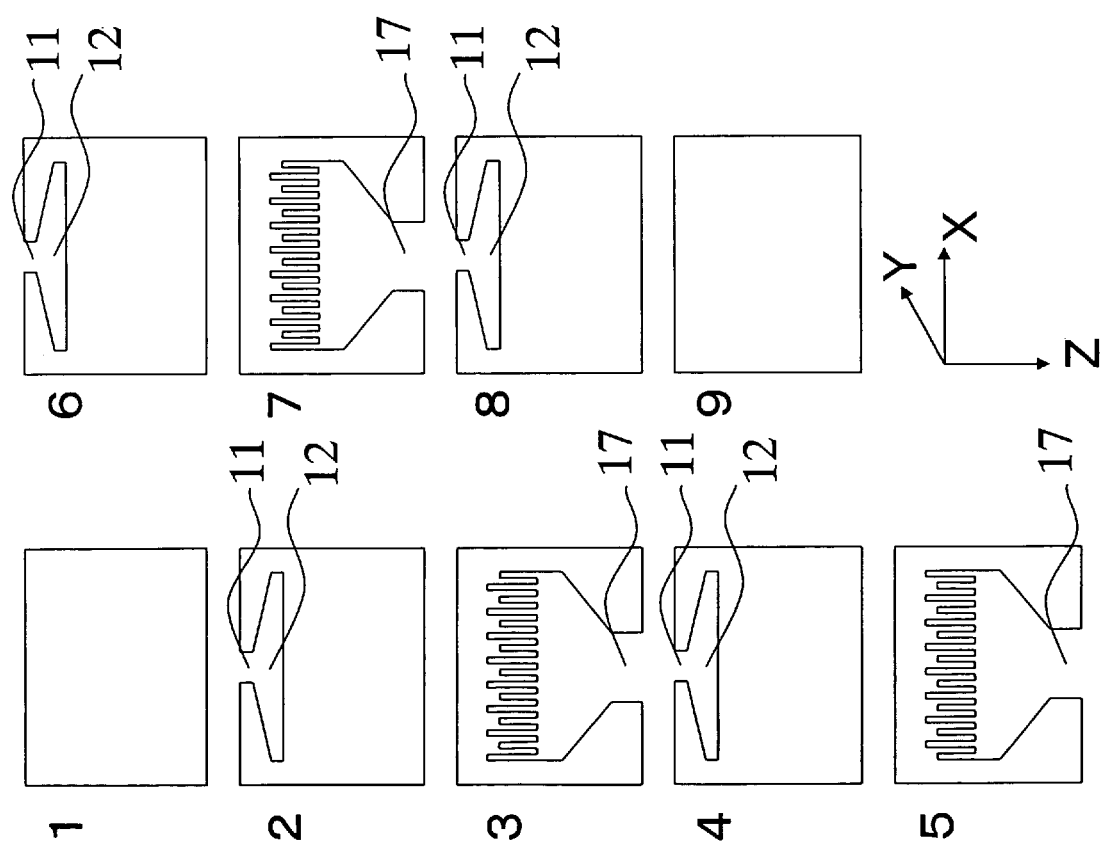
FIG. 1 shows a layering apparatus and the components thereof.
Figure 2:
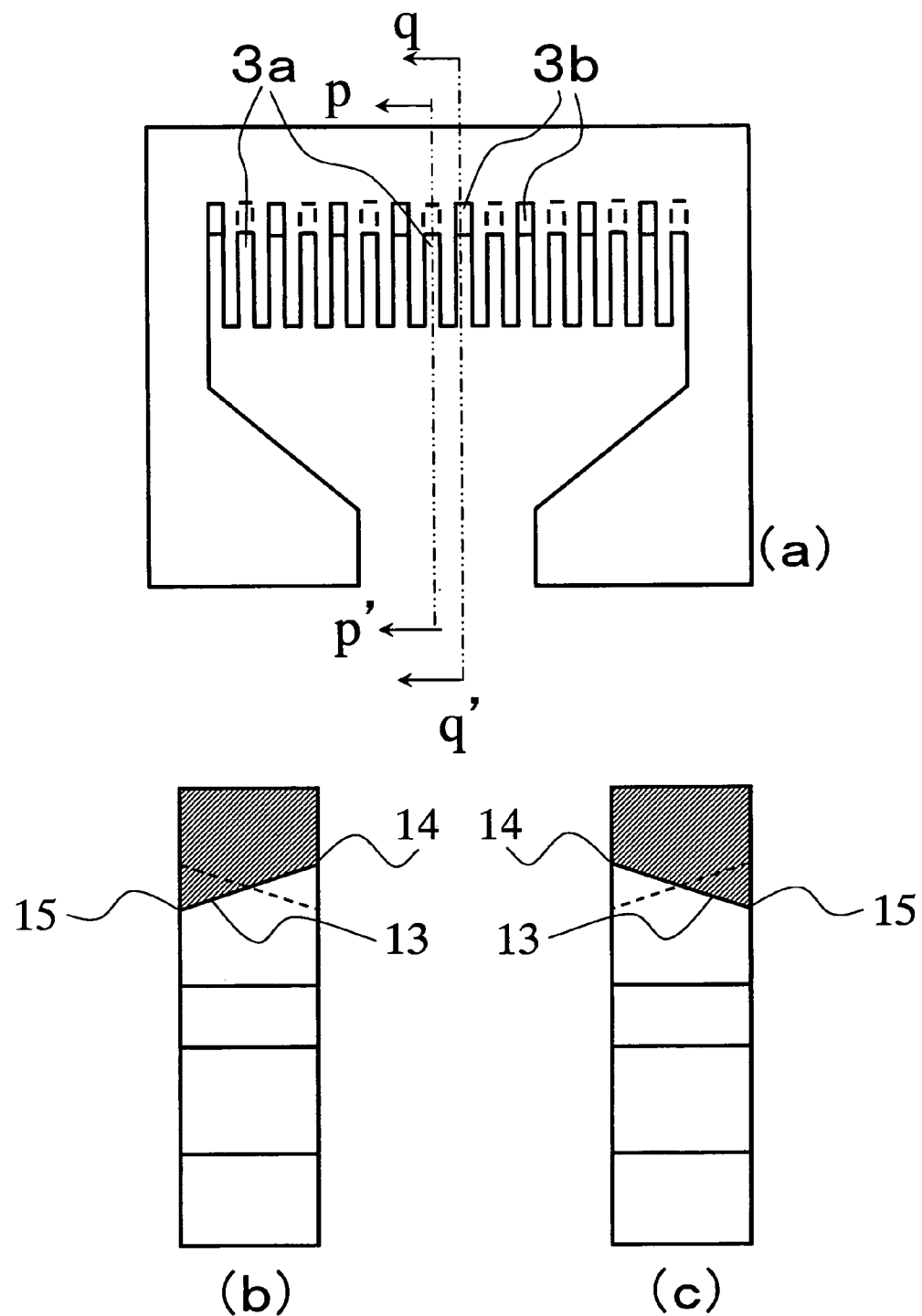
FIG. 2 shows a slit portion.

| | |
|---|---|
| 1 | side plate |
| 2 | portion for supplying resin A |
| 3 | slit portion |
| 3a, 3b | slits |
| 4 | portion for supplying resin B |
| 5 | slit portion |
| 6 | portion for supplying resin A |
| 7 | slit portion |
| 8 | portion for supplying resin B |
| 9 | side plate |
| 10 | layering apparatus |
| 11 | inlet |
| 12 | liquid storing portion |
| 18 | flow joining apparatus |
| 22 | side plate |
| 23 | portion for supplying resin A |
| 24 | slit portion |
| 25 | portion for supplying resin B |
| 26 | side plate |
| 27 | feed block and components thereof |

BEST MODE FOR CARRYING OUT THE INVENTION

In order to achieve the above described object, the multilayer film of the present invention has a structure where five ore more layers (layers A) made of thermoplastic resin A and five or more layers (layers B) made of thermoplastic resin B having a basic skeleton as that of thermoplastic resin A are alternately layered on top of each other, and has at least one or more peaks of reflection where the reflectance is no less than 30% and the difference in the reflectance in the peak of reflection before heating and after heating for 30 minutes in an atmosphere of 150° C. is no greater than 15%. This film has extremely little change in the optical properties of the multilayer film, and it is extremely difficult for detachment to occur between the layers during processing of the actual film and under the conditions for practical use and conditions for use over a long period of time.

Peak of reflection in the present invention refers to a band where the reflectance is no less than 30% when the reflectance is measured for wavelengths of light. Here, when several peaks of reflection are observed, it is defined as the band on the highest wavelength side. In addition, reflectance in the present invention refers to the reflectance of light that enters into the surface of the film in the direction that makes an angle of 100 with the vertical axis, and is measured using an integrating sphere in a spectrometer, unless otherwise stated. Here, it is preferable for the reflectance in the peak of reflection to be no less than 60%, and it is more preferable for it to be no less than 80%. In the case where the reflectance is no less than 80%, an extremely long wavelength can be selected, and therefore, the film becomes preferable as an optical filter or a decorative film.

In the present invention, the difference (R1−R2) between the reflectance (R1) in the peak of the reflection before heating and the reflectance (R2) in the peak of the reflection after heating for 30 minutes in an atmosphere of 150° C. must be no greater than 15%, it is preferable for it to be no greater than 13%, and it is more preferable for it to be no greater than 10%. Here, the reflectance before heating and the reflectance after heating must be compared at the same locations for measurement in the same samples, and the difference in the reflectance must be compared in the same wavelength band. In addition, in the case where several peaks of reflection exist, the reflectance in the peak of reflection on the highest wavelength side is compared. Conventional films, for example, contract a great deal, and therefore, the thickness of the film changes as a result of application of heat, and light in a wavelength band that is different from before heating is reflected. In addition, in other cases, the orientation and crystallinity of the resin that forms the multilayer film change as a result of application of heat, and therefore, the reflectance of the resin changes and the optical performance changes from before heating. The multilayer film of the present invention overcomes all of these problems. Here, in the case where the peak of reflection is a wide band, it is necessary for no less than 75% thereof to satisfy the above described conditions. Furthermore, in the case of a wide band where the bandwidth in the peak of reflection is no less than 100 nm, the average value of reflection within the peak of reflection must satisfy the above described conditions.

As the thermoplastic resin of the present invention, polyolefin resins, such as polyethylene, polypropylene, polystyrene and polymethyl pentane, cycloaliphatic polyolefin resins, polyamide resins, such as nylon 6 and nylon 66, aramid resins, polyester resins, such as polyethylene terephthalate, polybutylene terephthalate, polypropylene terephthalate, polybutyl succinate and polyethylene-2,6-naphthalate, polycarbonate resins, polyallylate resins, polyacetal resins, polyphenylene sulfide resins fluorine resins, such as ethylene tetrafluoride resins, ethylene trifluoride resins, ethylene trifluoride chloride resins, a copolymer of ethylene tetrafluoride-propylene hexafluoride and vinylidene fluoride resins, acryl resins, methacryl resins, polyacetal resins, polyglycolic acid resins and polylactic acid resins can be cited as examples.

From among these, polyester is particularly preferable, from the point of view of intensity, resistance to heat and transparency. In addition, these thermoplastic resins may be a homogenous resin, or a copolymer or a blend of two or more types. In addition, a variety of additives, for example an antioxidant, an antistatic agent, crystalline nuclei, inorganic particles, organic particles, a viscosity reducing agent, a thermal stabilizer, a lubricant, an infrared ray absorbent, an ultraviolet ray absorbent or a doping agent for adjusting the reflectance may be added to each of the thermoplastic resins.

It is preferable for the thermoplastic resin of the present invention to be polyester. Polyester in the present invention refers to a homogenous polyester which is a condensation polymer having a skeleton of a dicarboxylic acid component and a skeleton of a diol component, and a copolymerized polyester. Here, typical examples of the homogenous polyester are polyethylene terephthalate, polypropylene terephthalate, polybutylene terephthalate, polyehtylen-2,6-naphthalate, poly-1,4-cyclohexane dimethylene terephthalate and polyethylene diphenylate. In particular, polyethylene terephthalate is inexpensive and can be used in a wide range of applications, which is preferable.

In addition, copolymerized polyester in the present invention is defined as a condensation polymer having at least three or more components selected from the below described components having a skeleton of dicarboxylic acid and components having a skeleton of diol. As the components having a skeleton of dicarboxylic acid, terephthalic acid, isophthalic acid, phthalic acid, 1,4-naphthalene dicarboxylic acid, 1,5-naphthalene dicarboxylic acid, 2,6-naphthalenedicarboxylic acid, 4,4'-diphenyl dicarboxylic acid, 4,4'-diphenyl sulfone dicarboxylic acid, adipic acid, sebacic acid, dimer acid, cyclohexanedicarboxylic acid and esters derived from these can be cited. As the components having a skeleton of glycol, ethylene glycol, 1,2-propane diol, 1,3-butane diol, 1,4-butane diol, 1,5-pentadiol, diethyleneglycol, polyalkyleneglycol, 2,2-bis (4'-B-hydroxy ethoxy phenyl) propane, isosorbate, 1,4-cyclohexane dimethanol and the like can be cited.

The multilayer film of the present invention must have layers made of thermoplastic resin A and layers made of thermoplastic resin B having a basic skeleton that is the same as that of thermoplastic resin A. Here, the basic skeleton is a repeating unit which forms the resin, and in the case where one resin is polyethylene terephthalate, for example, ethylene terephthalate is the basic skeleton. In addition, in another example, in the case where one resin is polyethylene, ethylene is the basic skeleton. In the case where thermoplastic resin A and thermoplastic resin B have the same basic skeleton, it becomes difficult for detachment to occur between layers.

In addition, as for layers A and layers B of the present invention, the average reflectance within the surface of layers A is higher than the average reflectance within the surface of layers B when the two are compared. In particular, in the present invention, it is preferable for thermoplastic resin A to be polyethylene terephthalate and for thermoplastic resin B to be polyester with which cyclohexane dimethanol is copolymerized. More preferably, it is an ethylene terephthalate condensation polymer of which the amount of copolymerized cyclohexanedimethanol is no less than 15 mol % and no greater than 60 mol %. Thus, the film has a high reflective properties and any change in the optical properties resulting from application of heat or passing of time becomes particularly small, and it becomes difficult for detachment to occur between layers. More preferably, thermoplastic resin A is polyethylene terephthalate and thermoplastic resin B is an ethylene terephthalate condensation polymer of which the amount of copolymerization of cyclohexanedimethanol is no less than 20 mol % and no greater than 30 mol %. In the case where thermoplastic resin B is an ethylene terephthalate condensation polymer of which the amount of copolymerization of cyclohexanedimethanol is no less than 20 mol % andno greater than 30 mol %, the reflectance in the peak of reflection of the multilayer film becomes high, change in the optical properties caused by thermal hysteresis becomes further small, adhesion between layers becomes quite excellent, it becomes difficult for the film to be torn when being manufactured, and productivity becomes excellent. An ethylene terephthalate condensation polymer of which the amount of copolymerized cyclohexanedimethanol is no less than 20 mol % and no greater than 30 mol % very strongly adheres to polyethylene terephthalate. In addition, the cyclohexanedimethanol group thereof has cis and trans isomers as geometrical isomers, as well as chair and boat type isomers as conformational isomers, and therefore, it is difficult for the ethylene terephthalate condensation polymer to be oriented and crystallized, and this is considered to be because the reflectance is high, change in the optical properties due to thermal hysteresis is further small, and it becomes difficult for the film to be torn when being manufactured.

The multilayer film of the present invention has a total number of layers A and layers B of no less than 250, and it is preferable for the squared value of the correlation coefficient to be no less than 0.4 and no greater than 1 when the order number of each layer B from one surface layer of the film and the thickness of the layer are linearly approximated. This indicates that the thickness of a layer has a certain gradient in a linear function manner from one surface to the surface on the opposite side, in such a manner that the thickness of the layer increases or decreases with a very high layer precision.

How to find the squared value of the correlation coefficient is described below. In order to find the correlation coefficient, first, the cross section of the film is observed with a transmission electron microscope so that information on the layer structure is gained, and after that, the thickness of each layer is measured through image analysis on the basis of this information. The observation of the cross section of the film and the image analysis are described in detail in the evaluation method of the present invention. Next, as for the thicknesses of the gained layers B, the layers from the thickest layer to the fifth thickest layer and the layers from the thinnest layer to the fifth thinnest layer are eliminated. This is done in order to remove abnormal values that might have occurred during the measurement of the layer thickness, and to remove the surface protective layers and the like from the calculation. Order numbers are placed on the eliminated layers B in such a manner that the order number 1 is placed on the outermost layer on one surface side, and order numbers 2, 3, and 4 are sequentially attached to the layers as they get closer to the surface on the opposite side until an order number is placed on the outermost layer on the opposite side. These order numbers and the thickness of these layers B are linearly approximated, and the squared value of the correlation coefficient is gained. Though how to linearly approximate and how to find the correlation coefficient are not particularly limited, the graph function of Excel 2000 by Microsoft Corporation is used in the present invention. In this case, the squared value of the correlation coefficient is outputted as $R^2$.

In the case where the squared value of the correlation coefficient is no less than 0.4 and no greater than 1, a multilayer film having a high reflectance and a peak of reflection having a wide band can be easily gained. In addition, the multilayer film has a small distribution of the reflectance in the peak of reflection and sharp wave length cut properties. Here, the distribution of the reflectance in the peak of reflection indicates a range of reflectance within a band in the peak of reflection when the band width is great. In addition, when the correlation coefficient has a value as described above, a multilayer film having excellent adhesiveness between layers can be easily gained. This is because a combination of thermoplastic resin A and thermoplastic resin B, which has a small difference in the reflectance but has excellent adhesiveness between layers, can be selected in order to gain a high layer precision, and therefore, the film can have a peak of reflection. In addition, it is more preferable for the squared value of the correlation coefficient to be no less than 0.5 and no greater than 1. It is most preferable for it to be no less than 0.6 and no greater than 0.9. The narrower the range of the squared value of the correlation coefficient becomes, the higher the reflectance and the smaller the distribution of the reflectance in the peak of reflection become. Here, in the case where the squared value of the correlation coefficient is no less than 0.9, the change in the thickness of the layer becomes too great, and the distribution of the reflectance sometimes becomes too great. In such a case, though it is naturally possible to make the distribution of the reflectance smaller by increasing the difference in the average reflectance within the surface between layers A and layers B, it becomes easy for detachment between layers to occur if this is done.

In addition, in the multilayer film of the present invention, the total number of layers A and layers B is no less than 250, and it is preferable for the squared value of the correlation coefficient, when the order number of each layer B and the thickness of the layer are approximated in a quadratic polynomial, to be no less than 0.4 and no greater than 1. In such a case, the layer precision is very high, and the layer thickness does not change monotonously, unlike linearly, and therefore, it becomes possible to further reduce the distribution in the reflectance in the peak of reflection. In a conventional layering technology, a mixer is used in order to increase the number of layers, particularly in the case where a peak of reflection in a wide band is provided. Therefore, only a monotonous change in the layer thickness can be achieved. In the present invention, however, a below described special layering apparatus is used, and therefore, it is made possible to arbitrarily control the thickness with a high layer precision even when the number of layers is no less than 640. Here, how to find the squared value of the correlation coefficient is the same as that using the above described linear approximation, and in a typical example of the present invention, a graph function of Excel 2000 by Microsoft Corporation is used, and the squared value of the correlation coefficient is calculated from the approximation in a quadratic polynomial of which the order is 2. In addition, it is more preferable for the squared value of the correlation coefficient to be no less than 0.5 and no greater than 1. It is most preferable for it to be no less than 0.6 and no greater than 1.0. The narrower the range of the squared value of the correlation coefficient becomes, the higher the reflectance and the smaller the distribution of the reflectance in the peak of reflection become.

In addition, in the multilayer film of the present invention, it is preferable for layer unevenness M in layers B that is found in the following formula to be no greater than 20%. The standard distribution of layers B and the average layer thickness are found in the following manner. First, the cross section of the film is observed with a transmission electron microscope so that information on the layer structure is gained, and after that, the thickness of each layer is measured through image analysis on the basis of this information. The observation of the cross section of the film and the image analysis are described in detail in the evaluation method of the present invention. Next, as for the thicknesses of the gained layers B, the layers from the thickest layer to the fifth thickest layer and the layers from the thinnest layer to the fifth thinnest layer are eliminated. This is done in order to remove abnormal values that might have occurred during the measurement of the layer thickness, and to remove the surface protective layers and the like from the calculation. A standard deviation and an average layer thickness are found for the thickness values of layers B, which have been gained as described above. In the case where layer unevenness M of layer B is no greater than 20%, the multilayer film has a peak of reflection with a very narrow band width. A material having a peak of reflection with a very narrow band width in this manner is appropriate as a reflective material of a reflection type front screen. It is more preferable for layer unevenness M of layers B to be no greater than 15%. It is more preferable for M to be no greater than 10%.

$$M=s/a\times 100$$

where M is a layer unevenness (%) of layers B, s is a standard deviation (nm) of layers B, and a is an average layer thickness (nm) of layers B.

In the multilayer film of the present invention, in the case where the thickness ratio of a layer A to an adjacent layer B (thickness of layer A/thickness of layer B) is Z, the low wavelength end in the peak of reflection on the highest wavelength side where the reflectance is no less than 30% is $\lambda 1$ and the high wavelength end is $\lambda 2$, it is preferable for the thickness (nm) of at least one layer from among layers A that form the film to be in a range from XA1 to XA2, which are indicated in the following formulas, and it is preferable for the number of layers A which are included in this range to be no less than $50\times(XA2/XA1)^2$. It is more preferable for the number of layers A which are included in this range to be no less than $100\times(XA2/XA1)^2$, and it is most preferable for it to be $200\times(XA2/XA1)^2$.

$$XA1=\lambda 1/(3.2\times(1+Z))$$

$$XA2=\lambda 2/(3.2\times(1+Z))$$

In the case where the number of layers A which satisfy the above described conditions is no less than $50\times(XA2/XA1)^2$, the distribution of the reflectance in the peak of reflection becomes small. In order to satisfy the above described requirements, a high layer precision must be achieved. In addition, in the case where the number of layers A which satisfy the above described conditions is no less than $100\times(XA2/XA1)^2$, the distribution of the reflectance in the peak of reflection becomes further smaller, which is preferable. In addition, in the case where the number of layers A which satisfy the above described conditions is no less than $200\times(XA2/XA1)^2$, the distribution of the reflectance in the peak of reflection becomes smaller and the reflection peak end becomes very sharp, making the resolution of the reflection peak end be no greater than 50 nm, which is more preferable.

Here, the thickness ratio Z of a layer A to an adjacent layer B (thickness of layer A/thickness of layer B) means an average value of the ratios of a layer A to an adjacent layer B of which the number is no less than half of the total number of ratios in the configuration made of layers A and layers B, which contribute to the reflection properties of the multilayer film. Here, layers A and layers B, which contribute to the reflection properties of the multilayer film, refer to layers A and layers B of which the layer thickness is in a range of no less than 30 nm and no greater than 800 nm. In addition, low wavelength end $\lambda 1$ and high wavelength end $\lambda 2$ are defined respectively as the wavelength on the low wavelength side and the wavelength on the high wavelength side where the reflectance of the reflection peak end is lower by 30%.

The multilayer film of the present invention includes at least one layer B that forms the film of which the thickness (nm) is in a range from XB1 to XB2, which are shown in the following formulas, and it is preferable for the number of layers B, which are included in this range, to be no less than $50 \times (XA2/XA1)^2$. It is more preferable for the number of layers A, which are included in this range, to be no less than $100 \times (XA2/XA1)^2$, and it is most preferable for it to be no less than $200 \times (XA2/XA1)^2$.

$$XB1 = Z \times XA1$$

$$XB2 = Z \times XA2$$

Thus, the distribution of the reflectance in the peak of reflection can further be restricted, which is preferable. In particular, in the case where the number of layers B is no less than $100 \times (XA2/XA1)^2$, the distribution of the reflectance in the peak of reflection becomes smaller, which is preferable. In the case where the number of layers B is no less than $200 \times (XA2/XA1)^2$, the distribution of the reflectance in the peak of reflection becomes smaller and the reflection peak end becomes very sharp, making the resolution of the reflection peak end be no greater than 50 nm, which is more preferable.

It is preferable for a portion where the thicknesses of layers A and/or the thicknesses of layers B gradually change from XA1 to XA2 and/or gradually change from XB1 to XB2 from the surface side of the film toward the opposite surface side to be included. It is preferable for a required number of layers A, for example, of which the thickness is in a range from XA1 to XA2, to exist in the multilayer film of the present invention, and in the case where the layers having different thicknesses are aligned at random, the distribution of the reflectance in the peak of reflection becomes great, which is not preferable.

In addition, it is preferable for the layer thickness of layers A and/or layers B to change to be substantially smaller on the surface side and to be substantially greater in the center portion of the film in the cross section from the surface side of the film toward the opposite surface side. Such a layer configuration is hereinafter referred to as a convex type. In a multilayer film having a convex type layer structure, the high wavelength end in the peak of reflection becomes very sharp, and therefore, the film becomes optimal as an edge filter which is required to have a high wavelength resolution on the high wavelength side.

In addition, it is also preferable for the layer thickness of layers A and/or the thickness of layers B to change to be substantially greater on the surface side, and change to be smaller in the center portion of the film in the cross section from the surface side of the film toward the opposite surface side. Such a layer structure is hereinafter referred to as a concave type. In a multilayer film having a concave type layer structure, the low wavelength end in the peak of reflection becomes very sharp, and therefore, the film becomes optimal as an edge filter which is required to have a high wavelength resolution on the low wavelength side.

In the multilayer film of the present invention, it is preferable for the thickness ratio Z of a layer A to an adjacent layer B to be no less than 0.8 and no greater than 5. It is more preferable for it to be no less than 0.9 and no greater than 1.1. In the case where the thickness ratio Z is smaller than 0.8 or greater than 5, the reflectance becomes small, and the distribution of the reflectance within the reflection band becomes great, which is not preferable. In addition, in the case where Z is no less than 0.9 and no greater than 1.1, the distribution of the reflectance within the reflection band becomes smaller, and it is difficult for reflections of high order to occur, which is more preferable.

In addition, it is preferable for the variation of the thickness ratios of layers A to adjacent layers B to be within ±20%. This variation is gained by dividing the difference between the maximum thickness ratio and the minimum thickness ratio by the thickness ratio having the center value in the distribution of the thickness ratios of layers A to layers B, which contribute to the reflection properties. In the case where the variation exceeds ±20%, it becomes difficult to gain a sufficient reflectance, and reflection occurs in the locations other than the designed peak of reflection, which becomes noise for the filter, and thus, is not preferable.

In the multilayer film of the present invention, it is preferable for the difference between the average reflectance within the surface of layers A and the average reflectance within the surface of layers B to be no less than 0.03. It is more preferable for it to be no less than 0.05, and it is most preferable for it to be no less than 0.1. In the case where the difference in the reflectance is smaller than 0.03, a sufficient reflectance is not gained, which is not preferable. In addition, in the case where the difference between the average reflectance within the surface of layers A and the reflectance in the direction of the thickness is no less than 0.03, and the difference between the average reflectance within the surface of layers B and the reflectance in the direction of the thickness is no less than 0.03, the reflectance in the peak of reflection is not reduced even when the incident angle becomes great, which is preferable.

The inclusion of a structure where layers (layers A) made of thermoplastic resin A and layers (layers B) made of thermoplastic resin B are alternately layered according to the present invention is defined as the existence of a portion having a structure where layers A and layers B are regularly layered in the direction of the thickness. That is to say, it is preferable for the order of alignment of layers A and layers B in the direction of the thickness not to be in a random state in the film of the present invention, and the order of alignment of the third or more layers other than layers A and layers B is not particularly limited. In addition, in the case where layers A, layers B and layers C made of thermoplastic resin C are provided, it is preferable for the layers to be layered in a regular order such as A(BCA)n, A(BCBA)n and A(BAB-CBA)n. Here, n is the number of the repetition of units, and in the case of n=3 in, for example, A(BCA)n, the layers which are layered in the order of ABCABCABCA in the direction of the thickness are indicated.

In addition, in the present invention, five or more layers (layers A) made of thermoplastic resin A and five or more layers (layers B) made of thermoplastic resin B must be respectively included. It is preferable for twenty five or more layers A and twenty five or more layers B to be included. Furthermore, it is more preferable for the total number of layers of layers A and layers B to be no less than 640. Sufficient reflectance cannot be gained unless the structure respectively includes five or more layers A and five or more layers B. In addition, though the upper limit value is not particularly limited, it is preferable for the number of layers to be no greater than 1500, taking into consideration the increase in the scale of the apparatus and reduction in the ease of wavelength selection accompanying the reduction in layer precision resulting from too many layers.

In some cases, several reflection peaks can be observed in the multilayer film of the present invention. The principle for determining the wavelength in the peak of reflection is shown in the following formula 1, and this peak of reflection is referred to as primary reflection. Thus, the primary reflection is used as a reference when defining high order reflection, for example secondary, tertiary and quaternary reflection, and the wavelength of these high order reflections is found as λ/N (N: order, integer of no smaller than 2).

$$2\times(na\cdot da+nb\cdot db)=\lambda \qquad \text{formula 1.}$$

where na is the average reflectance within surface of layers A, nb is the average reflectance within surface of layers B, da is the layer thickness of layers A (nm), db is the layer thickness of layers B (nm) and λ is the wavelength of main reflection (primary wavelength of reflection).

Here, in the multilayer film of the present invention, it is preferable for at least one of the high order reflective bands to have a reflectance of no greater than 30%. Here, the peak of reflection on the highest wavelength side observed is regarded as the primary peak of reflection, and band of high order reflective band refers to λ/N±25 nm for each band that is found by dividing wavelength λ of this primary peak of reflection by order N (N is an integer of no smaller than 2). Here, this ±25 nm is to take into consideration error in measurement, error in reading out the peak, and shifting of the reflectance due to dependence on the wavelength. In addition, in the case where the primary peak of reflection is, for example, in a certain wavelength range of λ1 to λ2, the section from λ1/N±25 nm to λ2/N±25 nm is the high order reflective band. It is preferable for at least one of the high order reflective bands to have a reflectance of no greater than 20%, and it is more preferable for the reflectance to be no greater than 15%. In this manner, at least one high order reflective band of which the reflectance is no greater than 30% can be provided, and thereby, it becomes difficult for coloring due to a high order reflective band, reduction in the purity of color and deterioration due to ultraviolet rays to occur, and therefore, an appropriate film can be gained. In addition, in the case where the reflectance of the film is no greater than 15%, it is almost at the same level as the reflection from the surface of the multilayer film, and therefore, coloring, reduction in the purity of color and deterioration due to ultraviolet rays hardly accelerate and work, and thus, an appropriate film can be gained.

In addition, it is more preferable for the order of the high order reflective band of the present invention to be secondary or lower and quaternary or higher. Furthermore, it is more preferable for the order to be secondary or lower and tertiary or higher. In the case where at least one reflective peak band where the reflectance is no greater than 30% and the order is secondary or lower and quaternary or higher exists, it means that there is no strong reflection in the wavelength region, which causes particularly significant problems, such as coloring due to the high order reflective band, reduction in the purity of color and deterioration due to ultraviolet rays, which is preferable.

In the multilayer film of the present invention, it is preferable for the difference in the reflectance in the peak of reflection in different locations in the direction of the film width to be within ±10%. Here, the film width is no smaller than 600 mm. In addition, different locations in the direction of the width are selected as locations −10 mm from both ends of the film and the center location, and the reflectance in the peak of reflection in these locations are compared and determined. It is preferable for the difference to be within ±8%, and it is more preferable for the difference to be within ±5%. In the case where the difference in the reflectance in the peak of reflection in different locations in the direction of the film width is within ±10%, inconsistency in the purity of color within the surface becomes within the range of tolerance, even when a film having a large area is used, which is preferable. In addition, the film having a large area becomes durable when used, even in the case where there slight change in the optical properties is caused due to heat, which is preferable.

In the multilayer film of the present invention, it is preferable for the difference in the reflectance of the secondary reflective band in different locations in the direction of the film width to be within ±5%. It is more preferable for the difference to be within ±3%. The reflectance of the secondary reflective band in different locations in the direction of the film width easily becomes different due to the layer unevenness in the direction of the width of the film. This is because the ratio between layers of thermoplastic resin A and layers of thermoplastic resin B differs in the direction of the width in accordance with a conventional layering method, and the absolute value of the reflectance of a high order reflection is generally low in comparison with the primary reflection, and therefore, a more significant difference in the reflectance is easily detected. When applied to near infrared ray filters for PDP and heat ray cutting filters, for example, the film is generally required to be colorless and transparent. In this case, when the film is designed so that the peak of the primary reflection is in the near infrared ray band, the secondary reflective band becomes a visible light band, and therefore, it is preferable for the reflectance of this secondary reflective band to be lower. At this time, in the case where there is a difference in the layer ratio due to the layer unevenness in the direction of the width, as in the prior art, there is a difference in the reflectance of the secondary reflective band in different locations in the direction of the film width, making the film appear colored, which is not preferable. In the present invention, in order to make the difference in the reflectance of the secondary reflective band in the direction of the width of the film within ±5%, the below described special layer apparatus is provided, making it possible to achieve such a film.

In the multilayer film of the present invention, it is preferable for the peak in heat emission to be no less than 0 J/g and no greater than 5 J/g when measured according to DSC (first heating). In the case where the peak in heat emission is no less than 0 J/g and no greater than 5 J/g when measured according to DSC, it becomes easy to make the difference in the reflectance between the reflective band before heating and the reflective band after heating within 10%. In addition, the adhesiveness within layers becomes excellent, which is preferable.

In the multilayer film of the present invention, it is preferable for layers other than the outermost layers essentially not to include particles of which the average particle diameter is no less than 20 nm and no greater than 20 μm. In the case where particles of which the average particle diameter is no less than 20 nm and no greater than 20 μm are included inside the multilayer film, the transparency becomes low and diffused reflection is caused, which is not preferable. In addition, this causes the layer precision to deteriorate and the reflection properties to deteriorate, which is not preferable.

In the multilayer film of the present invention, it is preferable for a layer having a thickness of no less than 3 μm of which the main component is polyethylene terephthalate to be provided on at least one surface. It is more preferable for a layer having a thickness of no less than 5 μm of which the main component is polyethylene terephthalate to be provided. In addition, it is most preferable for a layer having a thickness of no less than 3 μm of which the main component is polyethylene terephthalate to be provided on both surfaces. In the case where there is no layer having a thickness of no less than 3 μm of which the main component is polyethylene terephthalate, there are abnormalities in the distribution in the reflectance when a surface is scratched, which is not preferable. In addition, in the case where a functional layer such as an adhesive layer, a hard coat layer, a wear resistant layer, a reflection preventing layer, a color correction layer, a radio wave shielding layer, an ultraviolet ray absorbing layer, a printing layer, a metal layer, a transparent conductive layer, a gas barrier layer or a sticky layer is formed on a surface of the multilayer film, there may be unintended interference, depending on the reflectance of the functional layer and the configuration of the layers in the multilayer film, and thus, there may be reflection other than the intended peak or reflection in a band, and there may be unevenness in the interference, which is not preferable.

It is more preferable for layers made of an adhesive layer having a thickness of no less than 30 nm and no greater than 300 nm and a polyethylene terephthalate layer having a thickness of no less than 3 μm to be provided on at least one surface. The multilayer film of the present invention may be used in combination with a variety of functional layers, and therefore, it is required for the multilayer film to easily adhere to such functional layers. Therefore, it is desirable to form a layer having adhesiveness to a variety of materials, but provision of an adhesive layer to the surface of the simplest multilayer film in the configuration of the present invention causes unevenness in interference, which is not preferable. Accordingly, in the present invention, in order to suppress unevenness in interference as much as possible in the adhesive layer, it is preferable to form a layer made of polyethylene terephthalate having of no less than 3 μm on at least one surface of the multilayer film and to further form an adhesive layer having a thickness of no less than 30 nm and no greater than 300 nm on the surface thereof. In the case where the thickness of the adhesive layer is less than 30 nm or greater than 300 nm, there may be unevenness in the color, referred to as interference patterns, or the adhesiveness of the adhesive may become insufficient, which is not preferable.

In the multilayer film of the present invention, it is preferable for layers other than the outermost layers essentially not to include particles of which the average particle diameter is no less than 20 nm and no greater than 20 μm. In the case where particles of which the average particle diameter is no less than 20 μm and no greater than 20 μm are included in the multilayer film, transparency becomes low and diffused reflection is caused, which is not preferable. In addition, this causes the layer precision to deteriorate and the reflection properties to deteriorate, which is not preferable.

In the multilayer film of the present invention, it is preferable for the number of scratches of which the width is no less than 20 μm to be no greater than 20/m². It is more preferable for the number to be no greater than 15/m², and it is most preferable for the number to be no greater than 10/m². Here, the width of a scratch is defined as the size of the scratch in the direction of the length. In the case where such scratches exist, the reflectance of the film changes in a specific manner in the location where the scratch is, particularly in the multilayer film of the present invention, and therefore, the scratch becomes a bright spot; that is, a defect, which is not preferable.

In addition, in the multilayer film of the present invention, it is preferable for the difference in the Young's modulus between direction in the width of the film, the longitudinal direction and ±45° relative to the longitudinal direction to be no greater than 0.5 GPa. It is more preferable for the difference to be no greater than 0.4 GPa, and it is most preferable for the difference to be no greater than 0.3 GPa. In the multilayer film of the present invention, shifting of the reflective band of light that enters into the plane of the film may be inevitable, depending on the angle of incident light/received light, while in the prior art, there is a shift in the reflective band only when the direction of incident light/received light is different, even if the angle of incident light/received light is the same. In the present invention, it was found that to solve this problem, it is effective to suppress the difference in the orientation within the film surface, and in the case where the difference in the Young's modulus between direction in the width of the film, the longitudinal direction and ±45° relative to the longitudinal direction is no greater than 0.5 GPa, shifting of the reflectance on the basis of the direction of incident light/received light does not become a problem, which is preferable.

In addition, in the multilayer film of the present invention, a functional layer, for example an adhesive layer, a smooth layer, a hard coat layer, a static electricity preventing layer, a wear resistant layer, a reflection preventing layer, a color correcting layer, a radio wave shielding layer, an ultraviolet ray absorbing layer, a printing layer, a metal layer, a transparent conductive layer, a gas barrier layer, a hologram layer, a peeling layer, a sticky layer, an embossed layer or an adhesive layer may be formed on the surface.

In particular, when the multilayer of the present invention is used as a decorative film, it is preferable to form a color absorbing layer which absorbs color that becomes a complementary color of black or the peak of reflection, a metal layer, such as aluminum, silver, gold or indium, a printed layer, an adhesive layer or an embossed layer on the surface of the film.

In addition, in the case where the multilayer film is used as a counterfeit proof film, it is desirable to form a hologram layer, a printing layer, an adhesive layer, a metal layer, such as aluminum, silver, gold or indium, and a transparent metal layer compound layer, such as $Al_2O_3$, $Sb_2O_3$, $Sb_2S_3$, $As_2S_3$, BeO, $Bi_2O_3$, CdO, CdSe, CdS, CdTe, $Ce_2O_3$, $Cr_2O_3$, SiO, AgCl, $Na_3AlF_6$, $SnO_2$, $TiO_2$, TiO, $WO_2$, ZnSe, ZnS or $ZnO_2$, on the surface of the film. A multilayer film on the surface of which such a layer is formed is appropriate particularly as a material for embossed holograms.

In addition, in the case where the multilayer film is used as an optical filter, it is desirable to form a smooth/adhesive layer, a hard coat layer, a static electricity preventing layer, a reflection preventing layer, a color correction layer, a radio wave shielding layer, an ultraviolet ray absorbing layer or an infrared ray absorbing layer on the surface of the film. The multilayer film of the present invention having such a functional layer is also appropriate as an optical filter. As an optical filter, a near infrared ray cutting filter in a plasma display, a reflective plate which efficiently reflects the three primary colors of the backlight in a liquid crystal display, a reflective type front screen which efficiently reflects only light (RGB) from a projector, a color adjusting filter for selectively transmitting/reflecting the three primary colors so as to enhance the purity of color in a variety of displays or in a CCD camera, and a heat ray blocking film for cutting near infrared rays/infrared rays which is used for window glass for construction materials or cars can be cited.

In particular, the multilayer film of the present invention is appropriate for filters for PDP. In the multilayer film layer of the present invention, the peak of reflection is adjusted to the near infrared ray region (820 nm to 1200 nm), and thereby, near infrared rays emitted from a PDP panel can be efficiently blocked, and it is also possible to make the film colorless and highly transparent to the visible light range (400 nm to 800 nm). A reflection preventing layer, a hard coat layer, a color correcting layer and a radio wave cutting layer are formed on the surface of this multilayer film, and the film is pasted to reinforced glass or glass which is installed in front of a PDP display panel or display panel, and thereby, a more preferable filter for PDP is gained. In this PDP filter, the optical properties do not change through application of heat or over time. No detachment occurs between layers, there is almost no deterioration in the quality during the manufacturing process or in the environment for practical use, the transmittance is much higher than in the prior art, and the near infrared ray cutting ratio is also high, and therefore, it is possible to achieve power conservation for PDP, as well as increase in the brightness.

In addition, the multilayer film of the present invention is appropriate for reflective type front screens. In the multilayer film of the present invention, the reflective bands are designed so as not to overlap with the wavelength of light from indoor lamps as much as possible, and only the wavelength emitted from the projector is efficiently reflected, and thereby, it is possible to provide a front screen having high contrast even under bright light. In the case where the multilayer film of the present invention is used for a reflective type front screen, the multilayer film is pasted to a surface protective layer, a hard coat layer, a diffusion layer, an anisotropic diffusion layer, a black layer, an adhesive layer, a color correcting layer or a cloth, and thereby, it becomes more preferable. In the case where the multilayer film of the present invention is used as a reflective type front screen, it becomes possible to gain high contrast under bright light, and the optical properties do not deteriorate through application of heat or over time, and no detachment occurs between layers in practical use.

In addition, the film of the present invention is appropriate for use as a decorative film. A decorative film is a film for providing color or specific color patterns, and ornamental films for the interior and exterior design of cars, counterfeit proof films for the purpose of determining authenticity which are used for bills, tradable coupons, vouchers and negotiable papers, and films for a substrate or a reflective material for a hologram can be cited as examples.

It is preferable for the thickness of the multilayer film of the present invention to periodically, change in the longitudinal direction or in the direction of the width of the film. When the thickness of the film periodically changes in the longitudinal direction or in the direction of the width in this manner, the wavelength in the peak of the reflective wavelength corresponds to this fluctuation in the thickness, and therefore, in the case where there is a peak of reflection in a visible range, for example, an unprecedented design where color periodically changes within the film can be provided. Therefore, the film becomes appropriate for decorative films or counterfeit proof films.

A preferable range for ratio R of this periodic change in the thickness (R=maximum thickness/minimum thickness'100 (%)) is 5% to 500%. In the case where the ratio of change in the thickness is no less than 5%, change in the reflective interference color becomes great, providing excellent design, and it is preferable for the ratio to be no greater than 500%, from the point of view of productivity. In addition, a more preferable range for the ratio of change in the thickness is 7% to 300%, and the most preferable range is 10% to 200%.

As for the method for periodically changing the film thickness, (1) a method for periodically changing the amount of discharge in the step of extruding a film, (2) a method for periodically changing the speed of casting in the step of casting a film, (3) a method for periodically changing the voltage or the current in a static electricity applying apparatus in the step of casting a film, (4) a method for expanding a film at a high temperature, where tension for expansion is not achieved in the step of longitudinal expansion, and (5) a method for changing the slit in a mouthpiece by mechanically/thermally operating the bolt of the mouthpiece die are preferably used, but the manufacturing method for a film according to the present invention is not, of course, limited to these.

From among these methods, the method for periodically changing the voltage or the current in a static electricity applying apparatus in the step of casting a film, according to which the thickness can be efficiently adjusted in an arbitrary period using a variety of waves such as sign waves, triangular waves, rectangular waves, serrated waves and impulse waves, is preferable because the ratio of the change in the thickness can be adjusted to an arbitrary value.

In addition, as for the method for analyzing the period of fluctuation in the thickness of a film, a method for continuously measuring the film thickness and carrying out Fourier conversion on the data that has been gained in this manner for evaluation (hereinafter referred to as "FFT processing") is preferably used. As for FFT processing, "Mathematics for Engineers 1", first edition (Kyoritsu Printing Co., Ltd., Kyoritsu Zensho, page 516), for example, describes the principle of Fourier conversion, and "Optical Engineering", first edition (Kyoritsu Printing Co., Ltd.), for example, describes a technique for FFT processing. In the multilayer film of the present invention, it is preferable for one or more peaks in the spectrum, where the Pw value is 0.04 to 25 in the wave number of 0.5 (1/m) to 100000 (1/m), to be observed when being analyzed using Fourier conversion. A preferable range of the wave number band where these peaks are observed is 1 (1/m) to 10000 (1/m), and it is more preferable for the range to be 10 (1/m) to 1000 (1/m). In addition, a preferable range of the observed Pw value is from 0.1 to 20, it is more preferable for the range to be from 0.2 to 10, and it is most preferable for the range to be from 0.3 to 5. In the case where the wave number band is within the above described ranges, the film of the present invention can be preferably used for the counterfeit proof application, and in the case where the Pw value is within the above described ranges, it becomes easy to observe the periodicity, which is preferable.

Here, Pw is a spectrum intensity Pwn for a certain wave number, which is determined in the following formula, in the case where data on the change in the thickness is converted to an absolute value of the thickness and the average value thereof is converted so as to be the center value of the change in the thickness, and this data is analyzed and FFT processing is carried out so that the gained real part is an and the imaginary part is bn.

$$Pwn = 2(an^2 + bn^2)^{1/2}/N$$

where n is a wave number (m-1) and N is the number of measurements.

In addition, when the half value width of this peak is kw and the peak wave number is kt, a preferable range of kw/kt is from 0.001 to 0.5, it is more preferable for the range to be from 0.01 to 0.2, and it is most preferable for the range to be from 0.1 to 0.2. In the case where kw/kt is within the above described ranges, the gained film has excellent decorativeness, and in addition, in the case of a counterfeit proof film, a hologram layer is provided, and at the same time, a cryptographic function or an authentication determining function is provided in the multilayer film itself, and therefore, an effect of double security is gained, which is preferable.

In addition, the multilayer film of the present invention is appropriate as a reflector for a solar battery. Furthermore, in the case where the film has a reflection peak where the reflectance is no less than 80% in a range from 300 nm to 2500 nm, the film is more appropriate as a reflector for a solar battery.

Preferably, the reflector for a solar battery has a reflection peak where the reflectance is no less than 90% in a range from 300 nm to 2500 nm. In addition, more preferably, the reflector for a solar battery has a reflectance of no less than 80% at least in a range from 450 nm to 1100 nm. As for the solar battery, silicon types (single crystal, polycrystal, amorphous), compound types and dye sensitization types are cited, and silicon types are widely used from the point of view of power generation cost. In these solar batteries, a reflector for a solar battery, which is referred to as a back sheet, is used. This reflector reflects solar rays that have transmitted the cells or have not transmitted the cells, and thereby, increases the efficiency in power generation, and a white sheet where a pigment is dispersed is widely used as a conventional reflector. The multilayer film of the present invention is used, and thereby, a higher reflectance is gained so that the efficiency in power generation increases and the reflectance can be prevented from being reduced due to heat being applied at the time of practical use, and therefore, a high efficiency can be maintained over a long period of time. In addition, it was found that in the case where a higher efficiency in power generation is gained and a reflection peak where the reflectance is no less than 80% in a range from 300 nm to 2500 nm is provided, it becomes possible to efficiently reflect only the wave length that makes photoelectric conversion possible in the solar battery cells, and therefore, the effects of preventing an increase in the temperature of the solar battery cells can be gained, and a further increase in the efficiency in power generation can be achieved. Accordingly, it is preferable for the reflectance to be 90%, and it is more preferable for the reflectance to be no less than 95% because a higher efficiency in power generation is achieved. In addition, in the case where the reflectance in a range at least from 450 nm to 1100 nm is no less than 80%, a higher efficiency in power generation is achieved, particularly in silicon type solar battery cells, which is preferable. In addition, in the case where a reflection band, of which the reflectance is in a range from 300 nm to 2500 nm is no less than 80%, is provided, the film is appropriate also as a mirror or a filter for a light condensing type solar battery. Here, a light condensing type solar battery refers to a system for collecting solar rays in solar battery cells, using a mirror or a lens, for power generation. In the case where the multilayer film of the present invention is used for a light condensing apparatus, only the wavelength of solar beams which make photoelectric conversion possible in solar battery cells can be selected, and therefore, an increase in the temperature of the cells can be prevented, and at the same time, optical properties do not deteriorate through the application of heat or over time and detachment between layers hardly occurs, which are characteristic features of the present invention, and thus, the performance hardly changes even in a severe outdoor environment, making it possible to make the reduction in the efficiency in power generation very small over time. Here, in the case where the cells are of a silicon type light condensing type solar battery and the light condensing apparatus is of a mirror type, the multilayer film of the present invention has a reflectance in a range at least from 450 nm to 1050 nm of no less than 90%, and it is preferable for the reflectance in a range from 1200 nm to 2000 nm to be no greater than 30%, and in the case where such a multilayer film is used as a mirror, it becomes possible to gain a high efficiency in power generation. In addition, in the case where the cells are of a silicon type light condensing type solar battery and the light condensing apparatus is of a lens type, the multilayer film of the present invention has a reflectance in a range from at least 450 nm to 1050 nm of no greater than 20%, and it is preferable for the reflectance in a range from 1100 nm to 2000 to be no less than 90%, and in the case where such a multilayer film is installed as a filter in front of or in back of a lens, it becomes possible to gain a high efficiency in power generation.

It is preferable for the reflector for a solar battery of the present invention to have a vapor transmissivity of no greater than 2 $g/(m^2 \cdot day)$. It is more preferable for the vapor transmissivity to be no greater than 1 $g/(m^2 \cdot day)$. In the case where the vapor transmissivity is no greater than 2 $g/(m^2 \cdot day)$, the solar battery cells are prevented from being deteriorated through the application of heat/moisture over time, the efficiency in power generation is prevented from lowering due to a reduction in the reflectance of the back sheet, and mechanical properties can be prevented from deteriorating due to a reduction in the expansion, providing an efficiency in power generation that is higher than that of the prior art, which is preferable. In order to achieve this, it is preferable for the reflector for a solar battery of the present invention to have any of a silica layer, an alumina layer and an aluminum layer, which can be formed through vapor deposition, or an aluminum foil. In addition, it is preferable for the reflector to have an aluminum foil of which the thickness is no less than 10 μm in order to achieve 1 $g/(m^2 \cdot day)$.

In the reflector for a solar battery of the present invention, it is preferable for the resistance to hydrolysis at 85° C. and at a humidity of 85% to be no less than 100 hours. Here, the resistance to hydrolysis is defined in accordance with the JIS C8917 test for resistance to humidity B-2 (1998). In the case where the resistance to hydrolysis is no less than 1000 hours, the efficiency in power generation can be prevented from being reduced due to a deterioration in the solar battery cells or due to a reduction in the reflectance of the back sheet over time, and the mechanical properties can be prevented from deteriorating due to a reduction in expansion, providing an efficiency in power generation that is higher than that of the prior art, which is preferable. In order to achieve this, it is preferable for the multilayer film that forms the reflector for a solar battery of the present invention to have a layer which is made of any of an ethylene terephthalate condensation polymer having an inherent viscosity of no less than 0.68 or a copolymer thereof, an ethylene naphthalate condensation polymer or a copolymer thereof, and a cyclohexane dimethanol condensation polymer or a copolymer thereof. In particular, in the case where the multilayer film has a layer made of polyethylene terephthalate having an inherent viscosity of no less than 0.68 and a layer made of an ethylene terephthalate condensation polymer, with which cyclohexane dimethanol is copolymerized, the multilayer film can be manufactured at a low cost, and in addition, a high reflectance can be easily gained due to an increase in the difference in the reflectance, and a high resistance to hydrolysis can be achieved, which is preferable.

It is preferable for the reflector for a solar battery of the present invention to be made of a multilayer film where the strength against tearing in the longitudinal direction and in the direction of the width is no less than 6 N/mm. It is preferable for the strength to be no less than 12 N/mm. Though the upper value is not particularly limited, it is no greater than 150 N/mm. In the case where the strength against tearing is no less than 6 N/mm, no cleavage is created in the reflective sheet even when the solar battery, where EVA (ethylene vinyl acetate) and a back sheet have been pasted together, is peeled due to the failure of pasting, which is preferable. In addition, in the case where the strength against tearing is no less than 6 N/mm, the reflector cannot be easily broken even in an outdoor environment when being used as a reflecting plate for a light condensing type solar battery, which is preferable. In addition, the higher the strength against tearing is, the easier it becomes to peel the reflector without creating cleavage, which is preferable. In order to achieve this, it is preferable for the multilayer film to have a layer made of polyethylene terephthalate and a layer made of ethylene terephthalate condensation polymer, with which cyclohexane dimethanol is copolymerized. In addition, in order to make the strength against tearing no less than 12 N/mm, it is preferable for the weight ratio (A/B) of polyethylene terephthalate (A) to an ethylene terephthalate condensation polymer (B), with which cyclohexane dimethanol is copolymerized, to be no less than 0.8 and no greater than 5 in the configuration of the multilayer film.

It is preferable for the reflector for a solar battery of the present invention to have an absorption band for a wavelength of no greater than 400 nm. In the case where an absorption band is provided for a wavelength of no greater than 400 nm, the back sheet can be prevented from deteriorating due to ultraviolet rays, and the efficiency in power generation can be prevented from being reduced, and the mechanical properties can be prevented from deteriorating.

Next, a preferable method for manufacturing a multilayer film according to the present invention is described in the following.

Two types of thermoplastic resins, A and B, are prepared in the form of pellets or the like. The pellets are supplied to different extruders after being dried in hot air or in a vacuum, if necessary. In the extruders, the resin is heated to a temperature of no lower than the melting point so as to be melted, and an amount of extruded resin is made uniform in a gear pump, and foreign substances and a degenerated resin are removed via a filter or the like.

Thermoplastic resins A and B, which have been fed out through different flow paths using two or more extruders as described above, are then fed into a multilayer layering apparatus. As for the multilayer layering apparatus, a multi-manifold die, a feed block, a static mixer or the like can be used. In addition, these may be arbitrarily combined. Here, in order for the effects of the present invention to be efficiently gained, a multi-manifold die or a feed block, which can individually control the thickness of each layer, is preferable. Furthermore, in order to control the thickness of each layer with high precision, a feed block, with which a microscopic slit for adjusting the amount of flow for each layer is provided by means of a wire discharge process with a process precision of no greater than 0.1 mm, is preferable. In addition, in order to make the temperature of the resin uniform at this time, heating in a thermal medium circulating system is preferable. In addition, the coarseness of the wall surface may be made no greater than 0.4 S or the contact angle with water at room temperature may be made no less than 300 in order to reduce the resistance with the wall surface within the feed block. High layer precision is achieved by using such an apparatus, and thus, it becomes possible to easily gain a multilayer film having a reflective peak.

In addition, in order for at least one or more reflective peaks to be provided according to a first aspect of the present invention, it is important to alternately layer five or more layers A and five or more layers B, respectively. In addition, it is necessary for the thickness of each layer to be designed in such a manner that a desired reflective peak is gained on the basis of the following formula 1. In addition, in order for the reflectance in the peak of reflection to be no less than 60% according to a preferred embodiment of the present invention, it is preferable for the total number of layers A and layers B to be no smaller than 50. In addition, in order for the reflectance in the peak of reflection to be no less than 80% according to another preferred embodiment of the present invention, it is preferable for the total number of layers to be no less than 100.

$$2\times(na\cdot da+nb\cdot db)=\lambda \qquad \text{formula 1}$$

where na is the average reflectance within the surface of layers A, nb is the average reflectance within the surface of layers B, da is the layer thickness of layers A (nm), db is the layer thickness of layers B (nm) and λ is the wavelength of the main reflection (primary reflective wavelength).

It is preferable to use a feed block (FIGS. 1 to 4), which separately includes at least two or more members having a number of microscopic slits, as a preferable multilayer layering apparatus of the present invention. When such a feed block is used, the apparatus is not extremely of a large scale, and therefore, there is only a small amount of foreign substances resulting form deterioration due to heat, and even in the case where the number of layers is extremely great, layering with high precision becomes possible. In addition, layering precision in the direction of the width is significantly high in comparison with the prior art. In addition, it is also possible to form a configuration having an arbitrary layer thickness. Therefore, it becomes easy to achieve the following configuration according to a preferred embodiment of the present invention:

a) the reflectance in the peak of reflection is no less than 80%;

b) the total number of layers A and layers B is no less than 250, and the squared value of the correlation coefficient when the order number of a layer B from one surface layer of the film and the thickness of the layer are linearly approximated is no less than 0.4 and no greater than 1;

c) the total number of layers A and layers B is no less than 250, and the squared value of the correlation coefficient when the order number of a layer B and the thickness of the layer are approximated in a quadratic polynomial is no less than 0.4 and no greater than 1;

d) in the case where the thickness ratio of a layer A to an adjacent layer B (thickness of layer A/thickness of layer B) is Z, the low wavelength end in the reflective band on the highest wavelength side where the reflectance is no less than 30% is λ1 and the high wavelength end is λ2, the thickness (nm) of layers A that form the film includes at least a thickness in a range from XA1 to XA2, which are shown in the following formula, and the number of layers A which are included in this range is no less than 200× $(XA2/XA1)^2$:

$$XA1=\lambda1/(3.2\times(1+Z))$$

$$XA2=\lambda2/(3.2\times(1+Z))$$

e) the thickness (nm) of layers B which form the film includes at least a thickness in a range from XB1 to XB2, which are shown in the following formula, and the number of layers B which are included in this range is no less than 200× $(XA2/XA1)^2$:

$$XB1=Z\times XA1$$

$$XB2=Z\times XA2$$

f) the thickness of a layer A and/or the thickness of a layer B includes a portion which gradually varies from XA1 to XA2 and/or a portion which gradually varies from XB1 to XB2 from a surface side of the film toward the opposite surface side;

g) the thickness of layers A and/or the thickness of layers B varies in such a manner that the layer thickness essentially becomes smaller toward the surface sides and the layer thickness essentially becomes greater toward the center portion of the film in the cross section;

h) the thickness of layers A and/or the thickness of layers B varies in such a manner that the layer thickness essentially becomes greater toward the surface sides and the layer thickness essentially becomes smaller toward the center portion of the film in the cross section;
i) in addition, the dispersion in the thickness ratio of a layer A to an adjacent layer B is within ±20%;
j) 640 or more layers (layers A) made of thermoplastic resin A and 640 or more layers (layers B) made of thermoplastic resin B are included respectively;
k) the difference in the reflectance in a reflective band in different locations in the direction of the film width is within ±5%; and
l) the difference in the reflectance in a secondary reflective band in different locations in the direction of the film width is within ±3%.

FIG. 1 shows a portion for forming layers of resins A and B which are separately supplied in the feed block (referred to as "layering apparatus"). In FIG. 1, members 1 to 9 are layered in this order so that a layering apparatus 10 is formed.

Layering apparatus 10 of FIG. 1 has four resin inlets resulting from resin introduction members 2, 4, 6 and 8 and, for example, resin A is supplied from inlets 11 of resin introduction members 2 and 4, and resin B is supplied from inlets 11 of resin introduction members 4 and 8.

Then, slit member 3 receives supply of resin A from resin introduction member 2 and resin B from resin introduction member 4, slit member 5 receives supply of resin A from resin introduction member 6 and resin B from resin introduction member 4, and slit member 7 receives supply of resin A from resin introduction member 6 and resin B from resin introduction member 8.

Figure 3:
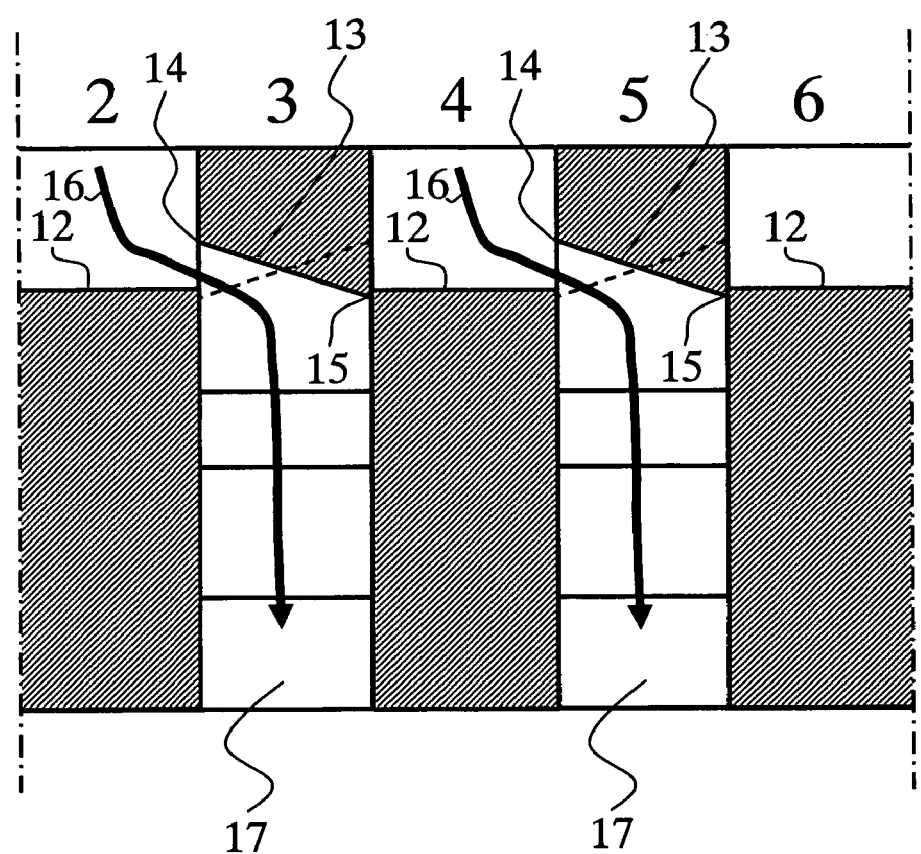
FIG. 3 is a cross sectional diagram showing the state where a slit portion and a resin supplying portion are linked.

Here, the type of resin that is introduced to each slit is determined by the positional relationships between the bottom surface of a liquid storing portion 12 in resin introduction members 2, 4, 6 and 8, and an end portion of each slit in the slit members. That is to say, as shown in FIG. 3, edge 13 of the top of each slit in the slit members is inclined relative to the direction of the thickness of the slit members (FIGS. 2(b) and 2(c)). In addition, the height of the bottom surface of liquid storing portion 12 in resin introduction members 2, 4, 6 and 8 is located between upper end portion 14 and lower end portions 15 of the above described edge 13. As a result, resin is introduced from resin storing portion 12 of resin introduction members 2, 4, 6 and 8 through the side where the above described edge 13 is high (16 in FIG. 3) while no resin is introduced through the side where the above described edge 13 is low and the slit is in a closed state. Thus, resin A or B is selectively introduced to each slit, and therefore, a flow of resins having a layered structure is formed in slit members 3, 5 and 7 and the resins flow out from openings 17 of the lower portion of these members 3, 5 and 7.

As for the form of slits, it is preferable for the area of slits on the side from which a resin is introduced and the area of slits on the side from which no resin is introduced not to be the same. In this structure, distribution of the flow amount on the side from which a resin is introduced and on the side from which no resin is introduced can be reduced, and therefore, layering precision in the direction of the width is increased. Furthermore, it is preferable for (slit area on side from which no resin is introduced)/(slit area on side from which a resin is introduced) to be no less than 0.2 and no greater than 0.9. It is more preferable for the ratio to be no greater than 0.5. In addition, it is preferable for the pressure loss within the feed block to be no less than 1 MPa. In addition, it is preferable for the slit length (longer slit length from among slit lengths in the direction of Z in FIG. 1) to be no less than 20 mm. Meanwhile, it is possible to control the thickness of each layer by adjusting the gap and the length of each slit.

In addition, it is preferable for a manifold to be provided corresponding to each slit. A manifold makes the distribution of the flow rate within a slit in the direction of the width (direction Y in FIG. 1) uniform, and therefore, the layer ratio in the direction of the width of the layered film can be made uniform making it possible to layer a film having a large area with high precision, and thus, the reflectance in the peak of reflection can be controlled with high precision.

In addition, it is preferable to supply a resin from one liquid storing portion to two or more slit members. In this manner, even in the case where there is a slight unevenness in the distribution of the flow amount in the direction of the width within a slit, layers are further layered in the below described flow joining apparatus, and therefore, the layering ratio is made uniform as a whole and it becomes possible to reduce the unevenness in a high order reflective band.

Figure 4:
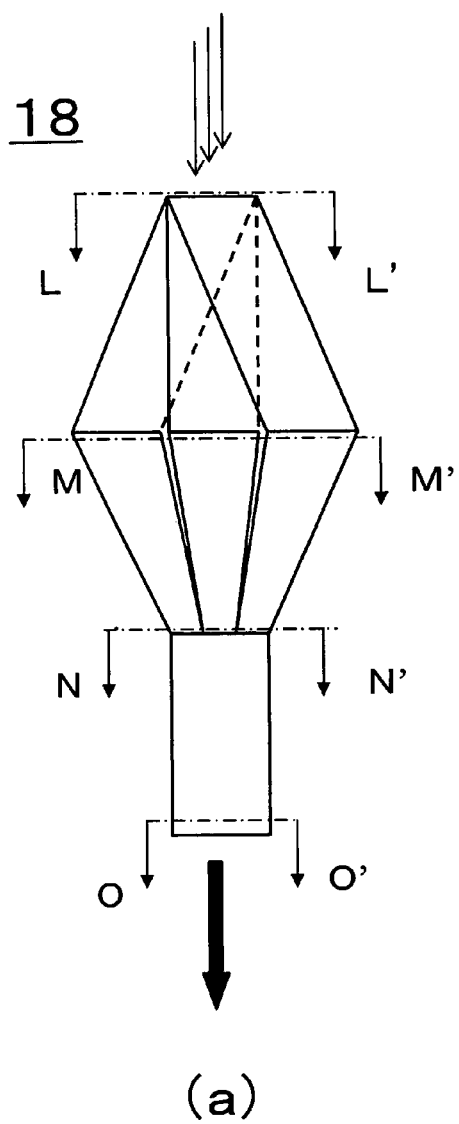
FIG. 4 shows a flow joining apparatus.
Figure 4:
Figure 4:
Figure 4:
Figure 4:
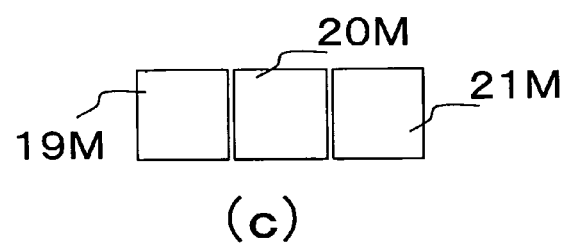
Figure 4:
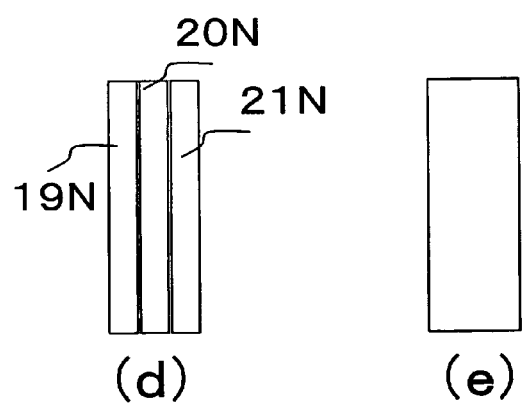

As shown in FIG. 1, openings 17 in the lower portions of slit members 3, 5 and 7 are placed so as to have positional relationships where the flow of three resins become parallel to each other in the layered structure, and are separated from each other by resin introduction members 4 and 6 (19L, 20L and 21L in FIG. 4). Therefore, in flow joining apparatus 18 as shown in FIG. 4, arrangement for regulating the flow paths is changed so as to provide a portion from L-L' to M-M' (19M, 20M and 21M in FIG. 4) and thus, the flow of three resins becomes sequential in the layered structure. The width of this resin flow is increased from M-M' to N-N' in FIG. 4 (19N, 20N and 21N) and is reduced downstream beneath N-N' in FIG. 4.

Thus, arbitrary layering of very thin resin layers with high precision becomes possible. It is general in a conventional apparatus to use a square mixer in order to achieve layering of 200 to more than 300 layers, and in this method, the layering flow is changed to an analogous form and is layered, and therefore, it is impossible to adjust the thickness of an arbitrary layer in c), f), g) and g) which are the above described preferred embodiment.

Next, in order to make the difference in the reflectance in the peak of reflection before heating and after heating for thirty minutes in an atmosphere of 150° C., no greater than 15% according to a second aspect of the second invention, thermoplastic resin B is an amorphous resin in normal conditions, and the density thereof may be no higher than 1.3 g/cm$^3$. Preferably, the density of thermoplastic resin B in the multilayer film is also no higher than 1.3 g/cm$^3$ and in this case it becomes easy to make the difference in the reflectance no higher than 13%. More preferably, thermoplastic resin B has a resin composition where a resin that is amorphous in normal conditions and a crystalline resin are compounded at a ratio of 50:50 to 99:1, and in this case, it becomes easy to make the difference in the reflectance before heating and after heating no greater than 10%. Here, the resin that is amorphous in normal conditions refers to a resin of which the amount of heat in the peak of heat emission for crystallization is no greater than 3 J/g when measured using DSC and when the temperature decreases at a rate 10° C./min after the temperature is increased to 300° C. In addition, the crystalline resin refers to a resin in the case where the amount of heat in the peak of heat emission for crystallization is greater than 3 J/g. When a crystalline resin and an amorphous resin are compounded in this manner, it becomes possible to make the difference in the average reflectance within the surface of thermoplastic resin A and thermoplastic resin B no less than 0.05 through expansion/heat processing, and thus, the reflectance of no less than 80% can be easily gained and at the same time, molecular orientation and crystallinity in the nanoalloy structure of the two resins are difficult to change at a temperature for conventional processing conditions or through application of heat over time, and as a result, there is almost no reduction in the reflectance through application of heat. According to the present invention, though thermoplastic resin A and thermoplastic resin B which has the same basic skeleton as that of thermoplastic resin A must be provided, thermoplastic resin B may be an amorphous resin without contradicting this condition. In an example of a combination of preferable resins according to the present invention, thermoplastic resin A is polyethylene terephthalate and thermoplastic resin B is an ethylene terephthalate condensation polymer with which 20 mol % to 30 mol % of cyclohexane dimethanol is copolymerized. In this case the same basic skeleton is ethylene terephthalate and the ethylene terephthalate condensation polymer with which 20 mol % to 30 mol % of cyclohexane dimethanol is copolymerized corresponds to an amorphous resin. In addition, in another example of a combination of preferable resins, of the present invention, thermoplastic resin A is polyethylene terephthalate and thermoplastic resin B is a resin where polyester with which cyclohexane dimethanol is copolymerized and polyethylene terephthalate are compounded. In this case, if the polyester with which cyclohexane dimethanol is copolymerized is an amorphous resin the polyethylene terephthalate is a compounded resin even though the ethylene terephthalate is not condensation polymerized with the polyester with which cyclohexane dimethanol is copolymerized, and therefore, the same basic skeleton is provided.

In addition, in order for at least one high order reflective band of which the reflectance is no greater than 30% to be provided according to one preferred embodiment of the present invention, most of adjacent layers A and layers B have the layer configuration which satisfies the following formula 2. In order for the effects of the present invention to be efficiently gained, the following formula 2 must be satisfied and the average reflectance within each surface and the layer thickness are allowed to have a tolerance of no greater than 10%. In addition, in order for at least one or more high order reflective band of which the reflectance is no greater than 15% to be provided in accordance with a preferred embodiment of the present invention the allowance of the layer thickness is no greater than 5% and it is preferable for the allowance in the layer thickness not to have a regular portion between adjacent layers but to be at random. In order for the reflectance in the peak of reflection to be no less than 80% in the direction of the width of the film, and in order for formula 2 to be satisfied, very high layer precision is required and it is impossible to easily and stably achieve such layer precision according to a conventional method, and in order to achieve such high layer precision, it is particularly preferable for layers to be layered in a feed block where 100 or more and 300 or less microscopic slits having a surface coarseness of no less than 0.1 S and no greater than 0.6 S are provided in this discharge wire processing of which the process precision is no greater than 0.01 mm, and after that, it is particularly preferable for the width of the layers not to be increased in the direction of the thickness in a flow path from the die to the discharging portion. In addition, as for the form of silts, it is preferable for (slit area on the side from which no resin is introduced)/(slit area on the side from which a resin is introduced) to be no greater than 50% and it is preferable for the slit length (longer length from among slit lengths in the direction of Z in FIG. 1) to be no less than 20 mm. It is more preferable for a feed block shown in FIGS. 1 to 4 to be used.

$$na \cdot da = nb \cdot db \times (N-1) \qquad \text{formula 2}$$

where na is the average reflectance within the surface of layers A, nb is the average reflectance within the surface of layers B, da is the layer thickness of layers A (nm), db is the layer thickness of layers B (nm) and N is the order (integer of no less than 2).

In addition, in order for the order of the high order reflective band of which the reflectance is no greater than 30% to be achieved to be secondary or lower and quaternary or higher according to a preferred embodiment of the present invention, it is preferable for N to be no less than 2 and no greater than 4 in formula 2.

In addition, according to the present invention, it is preferable for a portion where the thickness of layers A and/or the thickness of layers B gradually becomes greater from one surface side of the film toward the opposite surface side to be included in order for the wavelength band in the peak of reflection to be expanded, and it is more preferable for the thickness of layers A and/or the thickness of layers B to become gradually greater from one surface side of the film toward the opposite surface side throughout almost the entirety of the film in the cross section.

Meanwhile, it is also preferable for the thickness of layers and/or the thickness of layers B to change from one surface side of the film toward the opposite surface side in such a manner that the layer thickness essentially becomes greater in the center portion of the film in the cross section, which is of a convex type. In such a case, the high wavelength end in the reflective wavelength band becomes very sharp and therefore, the filter becomes optimal for an edge filter which is required to have a high wavelength resolution on the high wavelength side.

In addition, it is also preferable for the thickness of layers and/or the thickness of layers B to change from one surface side of the film toward the opposite surface side in such a manner that the layer thickness essentially becomes smaller in the center portion of the film in the cross section, which is of a concave type. In such a case, the low wavelength end in the reflective wavelength band becomes very sharp and therefore, the filter becomes optimal for an edge filter which is required to have a high wavelength resolution on the low wavelength side.

It is important to have an optimal layer structure corresponding to the properties of a reflective film which is designed in the above described manner, and according to the present invention, a multilayer layering apparatus illustrated in FIGS. 1 to 4 is used in a case where the total layer number is very great so that the thickness of each layer can be adjusted in accordance with the form (length, width) of a slit, and therefore, an arbitrary layer thickness can be achieved and it is possible to implement an optimal layer structure.

In order for the squared value of the core relation coefficient when the total number of layers A and layers B is no less than 250 and the order number of a layer B from one surface layer of the film and the thickness of the layer are linearly approximated to be no less than 0.4 and no greater than 1, it is preferable to use an apparatus illustrated in FIGS. 1 to 4. In the case where this apparatus is used, it becomes easy to make the squared value of the correlation coefficient no less than 0.4 according to the method for adjusting the squared value of the correlation coefficient when an essential amount of change in the layer thickness (ratio of change in an essential minimum thickness relative to the reference of an essential maximum thickness) is no less than 15%. In addition, in order to make the squared value of the correlation coefficient no less than 0.5, the ratio of change in the layer thickness must be no less than 20% and the length of slits must be no less than 40 mm. Furthermore, in order to make the squared value of the correlation coefficient no less than 0.7, the lengths of slits must be no less than 50 mm.

In addition, in the case where the total number of layers A and layers B is no less than 250 and the squared value of the correlation coefficient when the order number of a layer B and the thickness of the layer are approximated in a quadratic polynomial is no less than 0.4 and no greater than 1 according to one preferred embodiment of the present invention, it is also preferable to use the apparatus illustrated in FIGS. 1 to 4. In the case where this apparatus is used, the form of slits and/or the intervals of slits are adjusted so that the layer thickness has a designed secondary function distribution in accordance with a method for adjusting the squared value of the correlation coefficient. By doing this, it becomes easy to make the squared value of the correlation coefficient no less than 0.7.

Here, the thus gained melted layered body is formed so as to have a target form using a die and after that discharged. Here, it is preferable for the die for molding a layer in sheet form to have a ratio of expansion in the width of a layered body within the die of no less than 1 and no greater than 100. It is more preferable for the ratio to be no less than 1 and no greater than 50. In the case where the ratio of expansion in the width of a layered body within the die is greater than 100, inconsistency in the layer thickness in the surface layer portion of the layered body becomes great, which is not preferable. The ratio of expansion in the width of a layered body within the die is no less than 1, and no greater than 100, and thereby, it becomes easy to make the difference in the reflectance in the direction of the width of the multilayer film within ±10%. In addition, in order to make the difference in the reflectance in the direction of the width within ±5%, it is preferable for the flow path in the direction of the film thickness not to be expanded during the process where the melted layers flow through the flow path. In the case where the melted layered body which has been layered with high precision is expanded in the direction of the thickness through the flow path, there is a great difference between the flow rate in the surface layer portion and the flow rate in the center portion, and an inclined structure is first created where the thickness of the layers gradually changes in the direction of the film thickness and in the case where the width is further expanded in order to form a sheet (the flow path is spread in the direction of the film width) the inclined structure of the layered body is further expanded in the center portion in the direction of the width where the flow rate is high, and therefore, it becomes difficult for the resulting sheet to have a difference in the reflectance in the direction of the width within ±5%.

Thus, a multilayer sheet that has been discharged from the die is extruded to the top of a cooling body, such as a casting drum, so as to be cooled and solidified, and thus, a casting film is gained. At this time, a method for quenching and solidifying a sheet by making the sheet make contact with a cooling body, such as a casting drum, by means of static electric force using an electrode in wire form, tape form, needle form or knife form, a method for quenching and solidifying a sheet by making the sheet make contact with a cooling body, such as a casting drum, by spraying air from an apparatus in slit form, spot form or flat form, and a method for quenching and solidifying a sheet by making the sheet make contact with a cooling body by means of a nip roll are preferable.

Here, as for the method for periodically changing the film thickness of a film according to one preferred embodiment of the present invention, though methods for (1) periodically changing the amount of discharge in the step of extruding a film, (2) periodically changing the rate of casting in the step of casting a film, (3) periodically changing the voltage or the current in a static electricity applying apparatus in the step of casting a film, (4) expanding a film at a high temperature where there is no tension against expansion in the step of longitudinal expansion, and (5) changing the slit in the mouthpiece by mechanically/thermally operating the die bolt of the mouthpiece are preferably used, the method for manufacturing a film according to the present invention is, of course, not limited to these.

From among these methods, methods for periodically changing the voltage or current in a static electricity applying apparatus in the step of casting a film where the thickness can be arbitrarily and efficiently adjusted in a variety of periods which are changed using a variety of waveforms, such as sine waveforms, triangular waveforms, rectangular waveforms, serrated waveforms and impulse waveforms is more preferable.

It is preferable for thus gained cast film to be biaxially expanded if necessary. Biaxial expansion refers to expansion in the longitudinal direction and in the direction of the width. Films may be expanded in two directions separately, or may be expanded in two directions simultaneously. In addition, films may be expanded a second time in the longitudinal direction and/or in the direction of the width. It is preferable, particularly in the present invention, to use simultaneously biaxial expansion, from the point of view of suppressing the difference in the orientation within the surface and preventing scratching of the surface.

First, a case of separate biaxial expansion is described. Here, expansion in the longitudinal direction refers to expansion for providing molecular orientation in the longitudinal direction of the film, and usually, this expansion results from a difference in the peripheral speed of the rolls, and this expansion may be carried out in one stage or may be carried out in multiple stages using a number of pairs of rolls. The degree of expansion differs depending on the type of resin, and usually, it is preferable for the degree to be 2 to 15 times, and in the case where polyethylene terephthalate is used for one of the resins that form the multilayer film, a degree of 2 to 7 times is particularly preferable. In addition, it is preferable for the temperature for expansion to be the glass transition temperature of the resin that forms the multilayer film to the glass transition temperature +100° C.

Surface processing, for example corona processing, frame processing or plasma processing, is carried out if necessary on the thus gained film that has been uniaxially expanded, and after that, properties such as smoothness, adhesiveness and static electricity preventing properties may be provided by means of inline coating.

In addition, expansion in the direction of the width refers to expansion for providing orientation to a film in the direction of the width, and usually, a tenter is used to carry a film by gripping the two ends of the film with clips in order to expand the film in the direction of the width. The degree of expansion differs depending on the type of resin, and usually it is preferable for the degree to be 2 to 15 times, and in the case where polyethylene terephthalate is used for one of the resins that form the multilayer film, a degree of 2 to 7 times is particularly preferable. In addition, it is preferable for the temperature for expansion to be the glass transition temperature of the resin that forms the multilayer film to the glass transition temperature +120° C.

It is preferable to carry out heat treatment within the tenter at a temperature of no lower than the temperature for expansion and no higher than the melting point on the film that has been biaxially expanded as described above, so that flatness and stability in the dimensions are provided. After heat treatment is carried out in this manner, the film is uniformly and gradually cooled to room temperature and then rolled up. In addition, relaxing treatment may be carried out, if necessary, simultaneously with heat treatment and gradual cooling.

A case of simultaneous biaxial expansion is described in the following. In the case of simultaneous biaxial expansion, it is easy to make the difference in the reflectance in the peak of reflection no greater than ±10% in the direction of the width, which is preferable. In the case of simultaneous biaxial expansion, surface processing, for example corona processing, frame processing or plasma processing, is carried out on the gained cast film if necessary, and after that, properties such as smoothness, adhesiveness and static electricity preventing properties may be provided through inline coating.

Next, the cast film is guided to a simultaneous biaxial tenter and carried with the two ends of the film gripped with clips, and thus, the cast film is expanded simultaneously and/or step by step in the longitudinal direction and in the direction of the width. As for the simultaneous biaxial tenter, though there are pantograph types screw types, driving motor types and linear motor types, driving motor types or linear motor types where the degree of expansion can be freely changed and a relaxing process can be carried out in any location are preferable. The degree of expansion differs depending on the type of resin, and usually a degree of expansion in the area of 6 times to 50 times is preferable, and in the case where polyethylene terephthalate is used for one of the resins that form a multilayer film, a degree of expansion in the area of 8 times to 30 times is particularly preferable for use. In particular, in the case of simultaneous biaxial expansion, it is preferable to make the degree of expansion the same in the longitudinal direction and in the direction of the width, in order to prevent a difference in orientation within the surface, and at the same time, it is also preferable to make the rate of expansion almost the same. In addition, it is preferable for the temperature for expansion to be the glass transition temperature of the resin that forms the multilayer film to the glass transition temperature +120° C.

It is preferable to subsequently carry out heat treatment on the film that has been biaxially expanded in this manner within the tenter at a temperature of no lower than the temperature for expansion and no higher than the melting point, in order to provide flatness and stability in the dimensions. At the time of this heat treatment, it is preferable to carry out an instantaneous relaxing process in the longitudinal direction immediately before and/or immediately after the film enters the heat treatment zone, in order to prevent inconsistency in the main orientation axis in the direction of the width. After this heat treatment, the film is uniformly and gradually cooled to room temperature and rolled up. In addition, a relaxing process may be carried out in the longitudinal direction and/or the direction of the width during heat treatment and gradual cooling if necessary. When an instantaneous relaxing process is carried out in the longitudinal direction immediately before and/or immediately after the film enters the heat treatment zone, it is possible to make the difference in the reflectance in the direction of the width of the film no higher than ±8%, which is preferable.

EXAMPLES

A method for evaluating the values for the properties of the film used in the present invention is described.

(Method for Evaluating Values for Properties)

(1) Observation of Cross Section of Film

The layer structure of a film of the samples which were cut to expose a cross section using microtome was observed using an electron microscope. That is to say, an HU-12 transmission type electron microscope (made by Hitachi Ltd.) was used to observe a 40000 times magnification of a cross section of a film, and a photograph was taken of the cross section. The contrast may be increased by means of a dye technology using well known $RuO_4$ or $OsO_4$, depending on the combination of used thermoplastic resins, though this was not carried out in the example of the present invention because sufficient contrast was gained.

(2) Reflectance

The reflectance was measured in a spectrophotometer (U-3410) made by Hitachi Ltd. to which a f 60 integral sphere 130-0632 (made by Hitachi Ltd.) and a spacer inclined by 10° were attached. Here, the band parameter was set at 2/servo and the gain was set at 3, so that the range of 187 nm to 2600 nm was measured at a detection rate of 120 nm/min. In addition, in order to standardize the reflectance, an attached $BaSO_4$ plate was used as a standard reflective plate. In addition, the wavelength in the peak of reflection was the wavelength which became the top of the peak. In addition, in the case where a wavelength band of which the reflectance is no less than 30% had a range of no less than 100 nm, the wavelength in the peak of reflectance is indicated by the region in which the reflectance was no less than 30%. In addition, this reflectance was found by averaging the reflectance within the band from the high wavelength end, where the reflectance was no less than 30%−30 nm, to the low wavelength end, where the reflectance was no less than 30%+30 nm. In addition, the difference between the maximum reflectance and the minimum reflectance within the band, which is no greater than the high wavelength end, where the reflectance was no less than 30%−30 nm, and no smaller than the low wavelength end, where the reflectance was no less than 30%+30 nm, is defined as the range of the reflectance within the peak of reflectance. Here, in the present method for evaluation, the relative reflectance is gained, and therefore, in some cases, the reflectance is no less than 100%.

(3) Inherent Viscosity

The viscosity was calculated from the viscosity of the solution measured at 25° C. in ortho-chlorophenol. In addition, the viscosity of the solution was measured using an Ostwald viscometer. The unit is indicated by [dl/g]. Here, the number n was 3, and the average value thereof was adopted.

(4) Fluctuation in Thickness of Film

A film thickness tester "KG601A," made by Anritsu Corporation and an electronic micrometer "K306C" were used, and the thickness of the film from which a portion having a width of 30 mm in the longitudinal direction and a length of 10 m was sampled was continuously measured. The ratio (%) of change in the thickness of the film was gained by dividing the difference between the maximum thickness and the minimum thickness within a length of film of 1 m by the average thickness and multiplying the resulting value by 100. Here, the ratio of change in the thickness of the film was measured for a number n of 5.

(5) Fourier Analysis of Fluctuation in Thickness of Film

At the time of the above described measurement of the fluctuation in the thickness in the longitudinal direction, a process for converting the output of an electronic micrometer to a numeric value was carried out using KEYENCE "NR-1000," so that a computer could take in these numeral values. The data was taken in by sampling 1024 points at intervals of 0.1 seconds during measurement of the fluctuation in the thickness over a length of approximately 1 m (the film was carried and measured at 0.6 m/min-(using a motor for low-speed winding), and thereby, the data on the fluctuation in the thickness over approximately 1 m was taken in at 0.1 sec× 1024×0.6 m/min+60 sec/min). The numeric data that was taken in in this manner was converted to a quantitative thickness using Excel 12000 by Microsoft Corporation, and Fourier conversion (FFT) was carried out for this fluctuation in the thickness. At this time, the data on the change in the thickness was converted to an absolute value for the thickness, and the data that was gained by carrying out conversion so that this average value became the center value for the change in the thickness was used for analysis. At this time, the length (m) of the film can be selected as a variable in the direction of the flow, and thereby, so that the intensity distribution relative to the wave number (1/m) is gained through an FFT process. Here, when the gained real part is $a_n$ and the imaginary part is $b_n$, the intensity of the spectrum $Pw''$ can be represented by the following formula:

$$Pw''=2(a_n^2+b_n^2)^{1/2}/N$$

where n is a wave number ($m^{-1}$) and N is 1024 (number of measurements).

(6) Reflectance after Heating Test

The sample of which the reflectance was measured in accordance with the method described in (2) was put into a hot wind oven within which the atmosphere was maintained at 150° C., and the film was left for 30 minutes in a state where no weight was applied, and after that, the sample was taken out to an area having room temperature. The reflectance of this sample was measured in accordance with the method described in (2) while the location where the reflectance was measured was kept the same. The reflectance (R2) after heating was subtracted from reflectance (R1) before heating, so that the difference in the reflectance was gained.

(7) Ratio of Thermal Contraction

A film having a width of 10 mm and a length of 150 mm was sampled, and standard lines at intervals of approximately 100 mm were drawn on the sample, and the intervals between these standard lines were measured precisely using an all-round projector. Next, the film sample was hung in the direction of the length, and a weight of 3 g was applied in the direction of the length, and then, the film sample was heated for 30 minutes in a hot wind oven within which the atmosphere was maintained at 150° C. The intervals between the standard lines were measured after heating, and are represented as a percentage as the ratio of the amount of contraction of the film to the original size.

(8) Density

The density of the film was measured using a solution of sodium bromide in accordance with the density gradient tube method of JIS-K-7112 (revised in 1980).

(9) Reflectance in Direction of Width

The reflectance in the direction of the width was measured at three points; two ends and the center portion, of a range where the thickness was approximately uniform in the direction of the width of the film, and is represented as the difference between the maximum value and the minimum value of the reflectance in the peak of reflectance from among these. Here, the width of the product in the present example was 620 mm, and therefore, the center portion and locations ±300 mm from the center portion of the product were sampled.

(10) Resistance to Hydrolysis

The test followed the test for resistance to moisture B-2 (1998) in JIS C 8917 at a temperature of 85° C. and a humidity of 85%.

(11) Vapor Transmittance

The vapor transmittance was measured following JIS K 7129B (1992) using a vapor transmittance meter "PERMATRAN" W3/31, made by Modern Control Ltd. under conditions of a relative humidity of 90% and a temperature of 40° C. The measured value is shown in units of $g/(m^2 \cdot day)$.

(12) Strength against Tearing

The strength against tearing (N) was measured using a tearing tester (made by Toyo Seiki Co., Ltd.) having a maximum load of 32 N on the basis of JIS K 7128-2 (1998) (Eremendolf tearing method). The measured value was divided by the thickness of the measured film, so that the strength against tearing (N/mm) was gained.

Here, the strength against tearing was gained by averaging the results of respective tests on 20 samples in the longitudinal direction and in the direction of the width.

(13) Peeling Test

A test was carried out following JIS K 5600 (2002). Here, the film was considered a hard material, and a grid pattern having 25 holes at intervals of 2 mm was cut out. In addition, a tape that was cut to a length of approximately 75 mm was made to adhere to the grid portion, and the tape was pulled and peeled at an angle close to 60 over a period of time of 0.5 seconds to 1.0 second. Here, as the tape, Cellotape (registered trademark) No. 252 (width: 18 mm), made by Sekisui Chemical Co., Ltd., was used. The results of evaluation are shown as the number of grids which were completely peeled. In addition, in the case where the thickness of the test film was smaller than 100 μm, a sample where the test film was strongly pasted to a biaxially expanded PET film ("Lumirror" T60, made by Toray Industries, Inc.) having a thickness of 100 μm with an adhesive was used for the peeling test. At this time, the test was carried out on the test sample where grids were cut out from the surface of the test sample, so that the cutting did not penetrate the test sample.

(14) Calorie in Peak of Heat Emission

Differential thermal analysis (DSC) was performed, and the calorie was measured and calculated following JIS-K-7122 (1987). First, the temperature was raised from 25° C. to 290° C. at a rate of 20° C./min in the first run, and after that, the system was cooled to 25° C. without holding at 290° C. In addition, the temperature was raised from 25° C. to 290° C. at a rate of 20° C./min in the subsequent second heating.

Apparatus: "Robot DSC-RDC220," made by Seiko Instruments & Electronic Ltd.

Data analyzed by "Disc Session SSC/5200"

Mass of sample: 5 mg

(15) Scratching

10 $m^2$ Of the film was observed while the surface of the film was illuminated with light from a fluorescent lamp, and scratches detectable by the eye were marked, and after that, the surface having marked scratches was observed with an optical microscope at a low magnification of approximately 10 times to 30 times. At this time, the number of scratches of which the width was no less than 20 μm was counted.

(16) Number of Layers, Thickness of Layers, Squared Value of Correlation Coefficient and Unevenness in Layers An image of a cross section of a film gained using a transmission type electron microscope (image of photograph having magnification of 40000 times) was taken with an image size of 720 dpi using a scanner (CanonScanD123U, made by Canon Inc.) and stored in a bit map file (BMP). Next, this BMP file was opened using image processing software Image-Pro Plus Ver. 4 (made by Media Cybernetics, Inc.), and the image was analyzed. Typical image processing conditions are described in the following. First, the image was processed through a low pass filter (size: 7×7, intensity: 10, number of times: 10), and after that, numerical data on position and brightness was gained in vertical thick profile mode. Here, the locations were scaled in advance using space correction. Sampling step 6 (extrapolation 6) and a three-point shift averaging process were carried out on this data on position and brightness using Excel 2000, made by Microsoft Corporation. Furthermore, the thus gained brightness was differentiated with the locations, and the maximum values and the minimum values of this differential curve were calculated. Then, the distance between the location of adjacent maximum values and minimum values was assumed to be the thickness of the layer, and the layer thickness throughout the entire layer was calculated. In order to calculate the squared value for the correlation coefficient and the unevenness in the multilayer, the values for the thickest layer to the fifth thickest layer and the thinnest layer to the fifth thinnest layer were extrapolated from the gained thicknesses of the layer B in advance. The squared value of each correlation coefficient was found from the thus gained order number and the layer thickness of layer B using the graph function of Excel 2000, made by Microsoft Corporation. In addition, the standard deviation and the standard layer thickness were also found using Excel 2000, made by Microsoft Corporation.

(17) Determination of Crystalline resin or Amorphous Resin

Differential thermal analysis (DSC) was performed, and the calorie was measured and calculated following JIS-K-7122 (1987). First, the temperature was raised from 25° C. to 290° C. at a rate of 10° C./min in the first run, and after that, the system was kept at 290° C. for 5 minutes. Subsequently, the temperature was lowered from 290° C. to 25° C. at a rate of 10° C./min. When the calorie in the peak of heat emission during crystallization of this drop in temperature was no greater than 3 J/g, the resin was determined to be amorphous resin. In addition, in when the calorie was greater than 3 J/g, the resin was determined to be crystalline resin.

Apparatus: "Robot DSC-RDC220," made by Seiko Instruments & Electronic Ltd.

Data analyzed by "Disc Session SSC/5200"

Mass of sample: 5 mg

Example 1

Thermoplastic resin A and thermoplastic resin B were prepared as the two types of thermoplastic resins. In Example 1, polyethylene terephthalate (PET) [F20S made by Toray Industries, Inc.] having an inherent viscosity of 0.65 was used as thermoplastic resin A. Here, this thermoplastic resin A was a crystalline resin. In addition, a resin that is gained by mixing polyethylene terephthalate where 30 mol % of cyclohexane dimethanol is copolymerized with ethylene glycol (CHDM copolymerized PET) [PETG6763 made by Eastman Co., Ltd.] with polyethylene terephthalate, having an inherent viscosity of 0.65, at a weight ratio of 85:15 in a biaxial extruder so that the mixture was kneaded and alloyed was used as thermoplastic resin B. The density of thermoplastic resin A before drying was 1.336 g/cm$^3$ and the density of thermoplastic resin B before drying was 1.285 g/cm$^3$. Here, the polyethylene terephthalate where 30 mol % of cyclohexane dimethanol is copolymerized with ethylene glycol (CHDM copolymerized PET) [PETG6763 made by Eastman Co., Ltd.] was an amorphous resin and the polyethylene terephthalate having an inherent viscosity of 0.65 was a crystalline resin. These thermoplastic resins A and B were respectively supplied to the extruder after drying.

Figure 5:
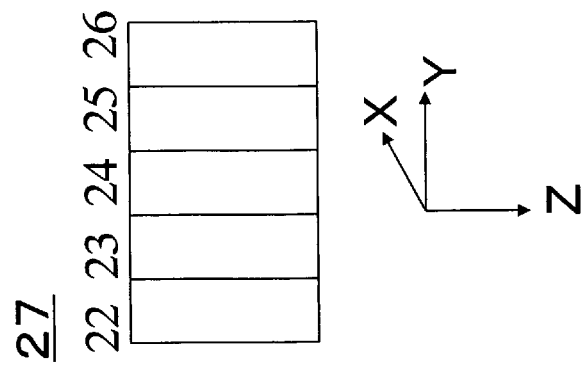
FIG. 5 shows a feed block.
Figure 5:
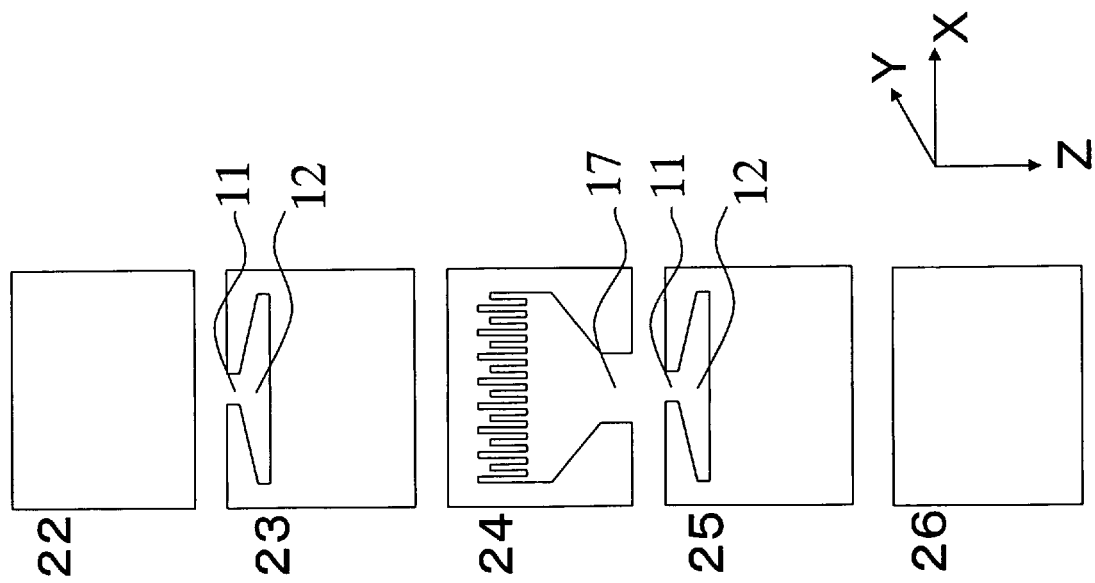

Thermoplastic resins A and B respectively in a melted state at 280° C. in the extruder and flowed through gear pumps and filters, and after that, merged together in a feed block for 201 layers. Here, an apparatus as shown in FIG. 5 was used as the feed block for 201 layers. This was made of one slit member having 201 slits. The thickness of the respective layers, from one surface side to the opposite surface side, of thermoplastic resins A and B that merged together was approximately constant within the feed block, and 101 layers of thermoplastic resin A and 100 layers of thermoplastic resin B are alternately layered in the direction of the thickness of the structure. The thickness of each layer was adjusted by adjusting the form of a microscopic slit (formed with a process precision of 0.01 mm) which is provided in a flow path for each layer within the feed block. As for the form of the slits, the length was 40 mm (long side in the figure) and (the slit area on the side into which resin is introduced)/(the slit area on the side into which resin is introduced) was 0.5. Here, the two surface layer portions were made of thermoplastic resin A. Here, the form of the feed block and the amount of discharge were adjusted so that the thickness ratio of layer A to adjacent layer B (thickness of layer A/thickness of layer B) became 0.95. Thus gained multilayer body having 201 layers in total was supplied to a die so as to be molded in sheet form, and after that, was quenched and solidified on a casting drum where the surface temperature was maintained at 25° C. through the application of static electricity (DC voltage: 8 kV).

A corona discharging process was carried out on the two surfaces of the gained cast film in the air so that wet tension of the base film became 55 mN/m and a coating liquid for forming multilayer film made of (a polyester resin having a glass transition temperature of 18° C.)/(a polyester resin having a glass transition temperature of 82° C.)/silica particles having an average particle diameter of 100 nm was applied to the processed surfaces of the base film, and thus, transparent/smooth/adhesive layers were formed. This cast film was led into a simultaneous biaxial expander in a linear motor system so as to be heated in advance with a hot wind of 95° C., and after that, expanded 3.5 times in the longitudinal direction and in the direction of the width. The expanded film was left in this state within the tenter where heat treatment was carried out with a hot wind of 230° C., and at the same time a relaxing process of 5% was carried out in the longitudinal direction, and subsequently, a relaxing process of 5% was carried out in the direction of the width, and then the film was gradually cooled to room temperature, and after that, rolled up. The thickness of the gained film was 21.1 μm. The resulting film is shown in Table 1. The gained film had almost no change in the optical performance through heat application and also had almost no peak in secondary reflection, and therefore, almost no unnecessary reflection in an ultraviolet ray vision was observed.

Example 2

A film was gained under the conditions which were the same as in Example 1 except that the number of layers in the feed block was 51 and the thickness of the film was adjusted to 5.3 μm by adjusting the speed of the casting drum. The gained film had almost no change in the optical performance through heat application and also had almost no peak in secondary reflection, and therefore, almost no unnecessary reflection in an ultraviolet ray vision was observed.

Example 3

Thermoplastic resin A and thermoplastic resin B were prepared as the two types of thermoplastic resins. Polyethylene terephthalate (PET) having an inherent viscosity of 0.65 [F20S made by Toray Industries, Inc.] was used as thermoplastic resin A. Here, this thermoplastic resin A was a crystalline resin. In addition, a resin that is gained by mixing polyethylene terephthalate where 30 mol % of cyclohexane dimethanol was copolymerized with ethylene glycol (CHDM copolymerized PET) [PETG6763 made by Eastman Co., Ltd] with polyethylene terephthalate having an inherent viscosity of 0.65 at a weight ratio of 85:15 in a biaxial extruder where the mixture was kneaded and alloyed was used as thermoplastic resin B. Here, the polyethylene terephthalate where 30 mol % of cyclohexane dimethanol was copolymerized with ethylene glycol (CHDM copolymerized PET) [PETG6763 made by Eastman Co., Ltd] was an amorphous resin and the polyethylene terephthalate having an inherent viscosity of 0.65 was a crystalline resin. The density of thermoplastic resin A before drying was 1.336 $g/cm^3$ and the density of thermoplastic resin B before drying was 1.285 $g/cm^3$. These thermoplastic resins A and B were respectively supplied to the extruder after drying.

Thermoplastic resins A and B were respectively in a melted state at 280° C. in the extruder and flowed through gear pumps and filters, and after that, merged-together in a feed block for 801 layers. An apparatus as shown in FIGS. 1 and 4 was used as the feed block for 801 layers. The above described feed block was made of three slit members having 267 slits. The thickness of the respective layers of thermoplastic resins A and B that merged together varied so as to be gradually larger from one surface side to the opposite surface side (slope type) within the feed block, and 401 layers of thermoplastic resin A and 400 layers of thermoplastic resin B are alternately layered in the direction of the thickness of the structure. As for the form of the slits, the length was 40 mm (long side in the figure) and (the slit area on the side into which resin is introduced)/(the slit area on the side into which resin is introduced) was 0.5. The thickness of each layer was adjusted by adjusting the form of a microscopic slit (formed with a process precision of 0.01 mm) which is provided in a flow path for each layer within the feed block. Here, the two surface layer portions were made of thermoplastic resin A. Here, the form of the feed block and the amount of discharge were adjusted so that the thickness ratio of layer A to adjacent layer B (thickness of layer A/thickness of layer B) became 0.95. Thus gained multilayer body having 801 layers in total was supplied to a multi manifold die and additional layers made of thermoplastic resin A that was supplied from another extruder were formed as the surface layers thereof so as to be molded in sheet form, and after that, was quenched and solidified on a casting drum where the surface temperature was maintained at 25° C. through the application of static electricity.

A corona discharging process was carried out on the two surfaces of the gained cast film in the air so that wet tension of the base film became 55 mN/m and a coating liquid for forming multilayer film made of (a polyester resin having a glass transition temperature of 18° C.)/(a polyester resin having a glass transition temperature of 82° C.)/silica particles having an average particle diameter of 100 nm was applied to the processed surfaces of the base film, and thus, transparent/smooth/adhesive layers were formed. This cast film was led into a simultaneous biaxial expander in a linear motor system so as to be heated in advance with a hot wind of 95° C., and after that, expanded 3.5 times in the longitudinal direction and in the direction of the width. The expanded film was left in this state within the tenter where heat treatment was carried out with a hot wind of 230° C., and at the same time a relaxing process of 5% was carried out in the longitudinal direction, and subsequently, a relaxing process of 5% was carried out in the direction of the width, and then the film was gradually cooled to room temperature, and after that, rolled up. The thickness of the gained film was 130 μm. The resulting film is shown in Table 1. The present example provided a colorless and transparent near infrared ray filter having almost no change in the optical performance through heat application where near infrared rays are efficiently reflected and almost no reflections of high order was observed in the visible light range.

Example 4

The same conditions as in Example 1 were used except that the thickness ratio of layer A to adjacent layer B (thickness of layer A/thickness of layer B) became 1.89 by adjusting the amount of discharge and the film thickness became 47.2 μm by adjusting the speed of the casting drum in Example 1. The resulting film is shown in Table 1. The gained film had almost no change in the optical properties through heat application and had almost no peak in the tertiary reflection, and therefore, almost no unnecessary peak in the reflection was observed in the visible light range, and thus a colorless near infrared ray refection film was provided.

Example 5

The same conditions as in Example 4 were used except that the thickness ratio of layer A to adjacent layer B (thickness of layer A/thickness of layer B) was 3.2 and the film thickness became 47.0 μm by adjusting the speed of the casting drum in Example 4. The resulting film is shown in Table 2. Though the gained film had almost no change, in the optical properties through heat application, a great number of reflections of high order were observed, and therefore, a green colored near infrared ray reflection film was gained.

Example 6

A copolymer polyester having an inherent viscosity of 0.75 of which the dicarboxylic acid is made of terephthalic acid and adipic acid where the ratio thereof is 80 mol %:20 mol % and of which the diol component is made of ethylene glycol and cyclohexane dimethanol where the ratio thereof is 90 mol %:10 mol % was used as thermoplastic resin B in Example 1. Other than the above the same conditions as in Example 1 were used. The gained film had almost no change in the optical performance through heat application and also had almost no peak in the secondary reflection, and therefore, almost no unnecessary reflections were observed in an ultraviolet ray region.

Example 7

The same conditions as in Example 4 were used except that polyethylene terephthalate where 30 mol % of cyclohexane dimethanol was copolymerized with ethylene glycol (CHDM copolymerized PET)[PETG6763 made by EastmanCo., Ltd.] was used as thermoplastic resin B, and the form of the slits within the feed block in Example 4 was changed so that the length became 40 mm (3b, long side in FIG. 2) and (the slit area on the side to which resin is not introduced)/(the slit area on the side to which resin is introduced) became 0.91. Here, the polyethylene terephthalate where 30 mol % of cyclohexane dimethanol was copolymerized with ethylene glycol (CHDM copolymerized PET) [PETG6763 made by Eastman Co., Ltd.] was an amorphous resin. The thickness of the gained film was 47.2 μm. The resulting film is shown in Table 2. The gained film had a slight change in the optical properties through heat application and had almost no peak in the tertiary reflection, and therefore, a colorless near infrared ray reflection film where almost no unnecessary peak in the reflection was observed in the visible light range was gained and it was difficult to use this film of a large area because the difference in the reflectance in the direction of the width was great in comparison with that in Example 4.

Example 8

The same conditions as in Example 7 were used except that a feed block which is the same as that in Example 1 was used in a structure where no compression or expansion in the width was carried out from the feed block to the die manifold portion in Example 7. The gained film was 47.2 μm. The resulting film is shown in Table 2. The gained film had a slight change in the optical properties through heat application and had almost no peak in the tertiary reflection, and therefore, a colorless near infrared ray reflection film was provided. In addition, there was almost no difference in the reflectance in the direction of the width, and therefore, it was possible to use the film of a large area.

Comparative Example 1

The same conditions as in Example 1 were used except that thermoplastic resin B was polyethylene terephthalate where 12 mol % of isophthalic acid was copolymerized with terephthalic acid having an inherent viscosity of 0.67 (isophthalic acid copolymerized PET) in Example 1. Here, this thermoplastic resin B was a crystalline resin. The resulting film is shown in Table 3. Optical performance changed through heat application in the gained film which could not be practically used.

Comparative Example 2

The same conditions as in Example 1 were used except that thermoplastic resin B was polyethylene terephthalate where 17.5 mol % of isophthalic acid was copolymerized with terephthalic acid having an inherent viscosity of 0.67 (isophthalic acid copolymerized PET) in Example 1. Here, this thermoplastic resin B was a crystalline resin. The resulting film is shown in Table 3. Optical performance changed through heat application in the gained film which could not be practically used.

Comparative Example 3

The same conditions as in Example 1 were used except that the layering apparatus was formed of a feed block having nine microscopic slits which was processed with a discharge wire with a process precision of 0.2 mm so as to have a surface coarseness of 2.0 S in the flow paths, three stages of square mixers having a total cross sectional area of flow paths of 200 mm$^2$ and a length 30 mm and a flow merging plate in Example 1. Though the thickness of the gained film was 14 μm and the number of layers was 129, the precision of layering was insufficient. The resulting film is shown in Table 3. Though the optical performance did not change through heat application in the gained film, there was no peak in the reflection and even the highest reflectance was 25%.

Example 9

The same conditions as in Example 1 were used except for that static electricity was applied in order to make the film make contact with the casting drum under the conditions where a sine wave having a center voltage of 8 kV and a voltage amplitude of 4 kV (peak-peak) was periodically applied and the average thickness of the film became 15.5 μm by adjusting the speed of the casting drum in Example 1. The resulting film is shown in Table 3. Though the gained film had green and blue in lateral step form which periodically exists with a pitch of approximately 50 mm on the surface of the film, no reflections of high order were observed in portions which exhibit the respective colors, and therefore, the film exhibited bright colors. In addition, there was almost no change in the optical properties through heat application.

Example 10

Thermoplastic resin A and thermoplastic resin B were prepared as the two types of thermoplastic resins. Polyethylene terephthalate (PET) having an inherent viscosity of 0.65 [F20S made by Toray Industries, Inc.] was used as thermoplastic resin A. In addition, polyethylene terephthalate where 30 mol % of cyclohexane dimethanol was copolymerized with ethylene glycol (PE/CHDM-T) [PETG6763 made by Eastman Co., Ltd.] was used as thermoplastic resin B. These thermoplastic resins A and B were respectively supplied to an extruder after drying.

Thermoplastic resins A and B were respectively in a melted state at 280° C. in the extruder and flowed through gear pumps and filters, and after that, merged together in a feed block for 801 layers in the same manner as in Example 3. The thickness of the respective layers of thermoplastic resins A and B that merged together varied so as to be gradually larger in linear form from one surface side to the opposite surface side (slope type) within the feed block, and 401 layers of thermoplastic resin A and 400 layers of thermoplastic resin B are alternately layered in the direction of the thickness of the structure. The thickness of each layer was adjusted by adjusting the form of a microscopic slit (formed with a process precision of 0.01 mm) which is provided within the feed block. In addition, as for the form of the slits, the length was 50 mm (long side in the figure) and (the slit area on the side into which resin is introduced)/(the slit area on the side into which resin is introduced) was 0.5. Here, the two surface layer portions were made of thermoplastic resin A. Here, the form of the feed block and the amount of discharge were adjusted so that the thickness ratio Z of layer A to layer B became 1. Thus gained multilayer body having 801 layers in total was supplied to a multi manifold die and additional layers made of thermoplastic resin A that was supplied from another extruder were formed as the surface layers thereof so as to be molded in sheet form, and after that, was quenched and solidified on a casting drum where the surface temperature was maintained at 25° C. through the application of static electricity.

A corona discharging process was carried out on the two surfaces of the gained cast film in the air so that wet tension of the base film became 55 mN/m and a coating liquid for forming multilayer film made of (a polyester resin having a glass transition temperature of 18° C.)/(a polyester resin having a glass transition temperature of 82° C.)/silica particles having an average particle diameter of 100 nm was applied to the processed surfaces of the base film, and thus, transparent/smooth/adhesive layers were formed. This cast film was led into a simultaneous biaxial expander in a linear motor system so as to be heated in advance with a hot wind of 95° C., and after that, expanded 3.5 times in the longitudinal direction and in the direction of the width. The expanded film was left in this state within the tenter where heat treatment was carried out with a hot wind of 230° C., and at the same time a relaxing process of 2% was carried out in the longitudinal direction, and subsequently, a relaxing process of 5% was carried out in the direction of the width, and then the film was gradually cooled to room temperature, and after that, rolled up. The thickness of the gained film was 128 μm. The resulting film is shown in Table 4. The gained film reflected near infrared rays without unevenness. In addition, when a hard coat layer and a reflection preventing layer were provided on one surface, unevenness in the interference caused almost no problem.

Example 11

The same conditions as in Example 10 were used except that the thickness ratio Z of layer A to layer B was 0.95 in Example 10. The thickness of the gained film was 130 mm. The resulting film is shown in Table 4. The gained film reflected near infrared rays without unevenness. In addition, when a hard coat layer and a reflection preventing layer were provided on one surface, unevenness in the interference caused almost no problem.

Example 12

The same conditions as in Example 10 were used except that the thickness ratio Z of layer A to layer B was 3.5 in Example 10. The thickness of the gained film was 130 mm. The resulting film is shown in Table 4. The gained film reflected near infrared rays without unevenness. In addition, when a hard coat layer and a reflection preventing layer were provided on one surface, unevenness in the interference caused almost no problem.

Comparative Example 4

The same conditions as in Example 10 were used except that a polyethylene terephthalate copolymer where 30 mol % of adipic acid was copolymerized with terephthalic acid having an inherent viscosity of 0.71 (PET/A) was used as thermoplastic resin B in Example 10. Here, this thermoplastic resin B was a crystalline resin. The thickness of the gained film was 128 mm. The resulting film is shown in Table 4. The gained film reflected near infrared rays without unevenness. In addition, when a hard coat layer and a reflection preventing layer were provided on one surface, unevenness in the interference caused almost no problem. However, the reflectance in the reflection band was lowered through heat application. In addition, peeling easily occurred.

Example 13

The same conditions as in Example 11 were used except that surface layers were formed of a resin made of polyethylene terephthalate having an inherent viscosity of 0.65 [F20S made by Toray Industries, Inc.] and 0.01 wt % of silica in spherical form having an average particle diameter of 100 nm within a die and no coating was provided in Example 11. The thickness of the gained film was 128 μm. The resulting film is shown in Table 5. The gained film reflected near infrared rays without unevenness. In addition, though unevenness in the interference caused almost no problem even when a hard coat layer and a reflection preventing layer were provided on one surface, adhesiveness of the film with a hard coat layer was inferior to that in Example 11.

Example 14

The same conditions as in Example 11 were used except that successive biaxial expansion occurred in the expansion system in Example 11. As for the successive biaxial expansion, first, the gained cast film was heated by a group of rolls of which the temperature was set at 75° C. and was expanded 3.4 times in the longitudinal direction while being heated rapidly by radiation heaters from both sides of the film during a section of expansion having a length of 100 mm. In addition, a diamond like carbon (DLC) processed roll having a surface coarseness of 0.4 S was used as the longitudinal expansion roll in order to reduce scratches caused by stains on the longitudinal expansion roll as much as possible and roll cleaning was also carried out using an excimer UV lamp. After that, a corona discharging process was carried out on the two surfaces of this uniaxially expanded film in the air so that wet tension of the base film became 55 mN/m and a coating liquid for forming multilayer film made of (a polyester resin having a glass transition temperature of 18° C.)/(a polyester resin having a glass transition temperature of 82° C.)/silica particles having an average particle diameter of 100 nm was applied to the processed surfaces of the base film, and thus, transparent/smooth/adhesive layers were formed.

This uniaxially expanded film was led into a tenter, preheated with a hot wind of 100° C. and after that expanded 3.7 times in the lateral direction. The expanded film stayed within the tenter in an unchanged state and heat treatment is carried out with a hot wind of 230° C., and subsequently, a relaxing process of 5% was carried out in the direction of the width at the same temperature, and after that, the film was gradually cooled to room temperature and rolled up. The thickness of the gained film was 128 μm. The resulting film is shown in Table 5. The gained film reflected near infrared rays without unevenness. In addition, even when a hard coat layer and a reflection preventing layer were provided on the surface, unevenness in the interference cause almost no problems. However, a slight amount of scratches was observed on the surface, and thus, the quality is not as good as in Example 11, and in some cases, the film could not be used as a filter where particularly high quality is strictly required.

Example 15

The same conditions as in Example 14 were used except that a conventional single die was used instead of a multi manifold die so as not to form a layer of thermoplastic resin A as a surface layer, and a chromium plated roll having a surface coarseness of 1.0 S was used as a longitudinal expansion roll, and in addition, roll cleaning using an excimer UV lamp was not carried out in Example 14. The thickness of the gained film was 118 μm. The resulting film is shown in Table 5. The gained film reflected near infrared rays without unevenness. In addition, when a hard coat layer and a reflection preventing layer were provided on one surface, unevenness in the interference became significant in comparison with Example 11. In addition, a large amount of scratches were observed on the surface in comparison with Example 11, and in many cases, the film could not be used as a filter where particularly high quality is strictly required.

Example 16

The same conditions as in Example 11 were used except a convex type layer structure where the thickness of the respective layers increases from one surface side to the vicinity of the center portion and decreases from the vicinity of the center portion to the other surface side within the feed block in Example 11. Here, a layer thickness was adjusted by adjusting the length of a slit. The thickness of the gained film was 138 μm. The resulting film is shown in Table 5. In the present example, the end on the high wavelength side in the reflective band became very sharp. The gained film reflected near infrared rays without unevenness. In addition, when a hard coat layer and a reflection preventing layer were provided on one surface, unevenness in the interference caused almost no problem.

Example 17

The same conditions as in Example 11 were used except a concave type layer structure where the thickness of the respective layers decreases from one surface side to the vicinity of the center portion and increases from the vicinity of the center portion to the other surface side within the feed block in Example 11. Here, a layer thickness was adjusted by adjusting the length of a slit. The thickness of the gained film was 138 µm. The resulting film is shown in Table 6. In the present example, the end on the low wavelength side in the reflective band became very sharp, and an edge filter which is optimal as a near infrared ray filter for a PDP or the like was provided. The gained film reflected near infrared rays without unevenness. In addition, when a hard coat layer and a reflection preventing layer were provided on one surface, unevenness in the interference caused almost no problem.

Example 18

The same conditions as it Example 11 were used except that thermoplastic resin A was a resin made of polyethylene terephthalate having an inherent viscosity of 0.65 [F20S made by Toray Industries, Inc.] and silica in spherical form (0.01 wt %), having an average particle diameter of 100 nm, and a die having a single manifold was used instead of a multi manifold die so as not to form the surface layers of thermoplastic resin A, and no coating was provided on the surface of the cast film in Example 11. The thickness of the gained film was 128 µm. The resulting film is shown in Table 6. The gained film reflected near infrared rays without unevenness. In addition, though unevenness in the interference caused almost no problem when a hard coat layer and a reflection preventing layer were provided on the surface, adhesiveness of the film with the hard coat layer was inferior to that of Example 11. In addition, the film looked slightly cloudy due to particles inside the film.

Example 19

The same conditions as in Example 1 were used except that 201 layers of thermoplastic resin A and 200 layers of thermoplastic resin B are alternately layered to form a multilayer body within the feed block in Example 11. Here, a layering apparatus formed of two slit members, a slit member having 201 slits and a slit member having 200 slits, was used within the feed block. The thickness of the gained film was 71 µm. The resulting film is shown in Table 6. The gained film reflected near infrared rays though there was slight unevenness in the reflectance. In addition, when a hard coat layer and a reflection preventing layer were provided on the surface, unevenness in the interference was tolerable though it was slightly observed.

Example 20

The same conditions as in Example 11 were used except that a feed block which is the same as that of Example 1 was used and 101 layers of thermoplastic resin A and 100 layers of thermoplastic resin B are alternately layered to form a multilayer body within the feed block in Example 11. The thickness of the gained film was 41 µm. The resulting film is shown in Table 6. The gained film reflected near infrared rays though there was slight unevenness in the reflectance. In addition, when a hard coat layer and a reflection preventing layer were provided on the surface, unevenness in the interference was tolerable though it was slightly observed.

Example 21

The same conditions as in Example 14 were used except that 201 layers of thermoplastic resin A and 200 layers of thermoplastic resin B are alternately layered to form a multilayer body within the feed block so as to provide a design where the reflective band became a band from 800 nm to 1650 nm in Example 14. Here, the structure of the feed block was the same as that of Example 19 though the silt length was adjusted. The thickness of the gained film was 85 µm. The resulting film is shown in Table 7. The gained film reflected visible light and near infrared rays though unevenness in the reflectance was great in comparison with that of Example 19. In addition, when a hard coat layer and a reflection preventing layer were provided on the surface, unevenness in the interference was significantly observed due to unevenness in the reflectance. In addition, a slight amount of scratches was observed on the surface.

Example 22

The same conditions as in Example 21 were used except that 401 layers of thermoplastic resin A and 400 layers of thermoplastic resin B are alternately layered to form a multilayer body within the feed block so as to provide a design where the reflective band became a band from 600 nm to 1650 nm in Example 21. Here, the structure of the feed block was the same as that of Example 10 though the silt length was adjusted. The thickness of the gained film was 150 µm. The resulting film is shown in Table 7. The gained film reflected visible light and near infrared rays though unevenness in the reflectance was great in comparison with that of Example 10. In addition, when a hard coat layer and a reflection preventing layer were provided on the surface, unevenness in the interference was significantly observed due to unevenness in the reflectance. In addition, a slight amount of scratches was observed on the surface.

Example 23

Thermoplastic resin A and thermoplastic resin B were prepared as the two types of thermoplastic resins. Polyethylene terephthalate (PET) having an inherent viscosity of 0.83 [J135 made by Mitsui Chemicals, Inc.] was used as thermoplastic resin A. In addition, polyethylene terephthalate where 30 mol % of cyclohexane dimethanol was copolymerized with ethylene glycol (PE/CHDM-T) [PETG6763 made by Eastman Corporation] was used as thermoplastic resin B. These thermoplastic resins A and B were respectively supplied to an extruder after drying. Here, this thermoplastic resin A was a crystalline resin and this thermoplastic resin B was an amorphous resin.

Thermoplastic resins A and B were respectively in a melted state at 290° C. in the extruder and flowed through gear pumps and filters, and after that, merged together in a feed block for 1601 layers as shown in FIG. 1. The thickness of the respective layers of thermoplastic resins A and B that merged together varied so as to be gradually larger from one surface side to the opposite surface side (slope type) within the feed block, and 801 layers of thermoplastic resin A and 800 layers of thermoplastic resin B are alternately layered in the direction of the thickness of the structure. The thickness of each layer was adjusted by adjusting the form of a microscopic slit (formed with a process precision of 0.01 mm) which is provided in a flow path for each layer within the feedblock. Here, the two surface layer portions were made of thermoplastic resin A. Here, the form of the feed block and the amount of discharge were adjusted so that the thickness ratio Z of layer A to layer B became 2. Thus gained multilayer body having 1601 layers in total was supplied to a multi manifold die and additional layers made of thermoplastic resin A that was supplied from another extruder were formed as the surface layers thereof so as to be molded in sheet form, and after that, was quenched and solidified on a casting drum where the surface temperature was maintained at 25° C. through the application of static electricity.

A corona discharging process was carried out on the two surfaces of the gained cast film in the air so that wet tension of the base film became 55 mN/m and a coating liquid for forming multilayer film made of (a polyester resin having a glass transition temperature of 18° C.)/(a polyester resin having a glass transition temperature of 82° C.)/silica particles having an average particle diameter of 100 nm was applied to the processed surfaces of the base film, and thus, transparent/smooth/adhesive layers were formed. This cast film was led into a simultaneous biaxial expander so as to be heated in advance with a hot wind of 95° C., and after that, expanded 3.5 times in the longitudinal direction and in the direction of the width. The expanded film was left in this state within the tenter where heat treatment was carried out with a hot wind of 230° C., and at the same time a relaxing process of 5% was carried out in the longitudinal direction, and subsequently, a relaxing process of 5% was carried out in the direction of the width, and then the film was gradually cooled to room temperature, and after that, rolled up. The thickness of the gained film was 225 µm, and the strength against pairing was 13 N/mm in the longitudinal direction and 12 N/mm in the direction of the width. The resulting film is shown in Table 1. The gained film and an aluminum foil having a thickness of 25 µm were pasted together so as to form a reflector for a solar battery. The vapor transmissivity of this reflector for a solar battery was 0.1 g/(m²·day). In addition, a silicon solar battery was fabricated using this reflector for a solar battery. The gained solar battery had a resistance to hydrolysis of no less than 2000 hours and the efficiency of power generation in the cell was 19.5%, which was higher than 18% in the case where a conventional white body ("Lumirror" E20 having a thickness of 50 µm to which an aluminum foil having a thickness of 25 µm was pasted) was used as the reflector for a solar battery. Here, there was almost no change in the reflection properties due to thermal hysteresis during the process or over time, and therefore, the amount of reduction in the efficiency of power generation caused by the reflective plate over time was small.

Example 24

The following color correcting layer and adhesive layer were formed on one surface of the multilayer film that was gained in Example 11, and thereby, an optical filter was gained. The following was prepared as dyes which are contained in the color correcting layer of the optical filter.

Dye A: porphyrazine based compound dye TAP-2 made by Yamada Chemical Co., Ltd.

Dye B: benzene dithiol based metal complex compound containing cyanine based compound dye SD5Cu-KNCO2 made by Sumitomo Seika Chemicals Co. Ltd.

These were mixed with HALS Hybrid IR-G205 made by Nippon Shokubai Co., Ltd, which is an acryl coating agent. In addition, the amounts of mixture of Dye A and Dye B were 0.56 wt % and 0.15 wt % of the solid component of the acryl coating agent, which was distilled with methyl ethyl ketone/toluene (1:1) so that the solid component became 20%. After that, the liquid was applied to the gained multilayer film with a bar coater so that the dry film thickness became 15 µm and then dried for three minutes at 120° C.

Furthermore, SK-Dyne 1435, made by Soken Chemical & Engineering Co., Ltd., which is an acryl based adhesive, was distilled with methyl ethyl ketone, so that the solid component became 50%, and after that, applied to the top of acolor correcting layer using an applicator, so that the film thickness of the adhesive after drying became 25 µm, and was dried for 3 minutes at 120° C.

The gained optical filter was appropriate as a near infrared ray cut film for a PDP having high quality in comparison with the prior art product (Comparative Example 5), with a brightness of the PDP of 91 cd/m² and a contrast of 410:1. In addition, the optical filter had no color, and no color was observed at a view angle of 50° (angle relative to the direction perpendicular to the screen). In addition, a test for resistance to heat over a long period of time, which is required for PDP filters (80° C., 500 hours), was carried out on this filter. As a result, it was found that transmissivity for near infrared rays (900 nm) was 92% after the test, as compared to 93% before the test, and thus, it was confirmed that it is difficult for the optical properties of the filter to change.

Comparative Example 5

The following near infrared ray absorbing/color correcting layer and an adhesive layer were formed on one surface of a single film ("Lumirror" U34, made by Toray Industries, Inc.) with an adhesive layer, and thus, an optical filter was fabricated. The following dyes were prepared as dyes to be contained in near infrared ray absorbing/color correcting layer of the optical filter.

Dye A: porphyrazine based compound dye TAP-2 made by Yamada Chemical Co., Ltd.

Dye B: diimonium based compound dye IRG-022 made by Nippon Kayaku Co. Ltd.

These were mixed with HALS Hybrid IR-G205 made by Nippon Shokubai Co., Ltd, which is an acryl coating agent. In addition, the amounts of mixture of Dye A and Dye B were 0.56 wt % and 2.5 wt % of the solid component of the acryl coating agent, which was distilled with methyl ethyl ketone/toluene (1:1) so that the solid component became 20%. After that, the liquid was applied to the gained multilayer film with a bar coater so that the dry film thickness became 15 µm and then dried for three minutes at 120° C.

Furthermore, SK Dyne 1435, made by Soken Kagaku Co., Ltd., which is an acryl based adhesive, was distilled with methyl ethyl ketone, so that the solid component became 50%, and after that, applied to the top of a color correcting layer using an applicator, so that the film thickness of the adhesive after drying became 25 µm, and was dried for 3 minutes at 120° C.

When the gained optical filter was used for a near infrared ray cut film for a PDP, only images at the level of the prior art were gained, where the brightness was 72 cd/m² and the contrast was 327:1, though no problem arose in terms of malfunctioning of the remote controller due to leakage of infrared rays. In addition, the optical filter had no color, and no color was observed at a view angle of 50 (angle relative to the direction perpendicular to the screen). Here, no reflective band was observed in the present comparative example.

Comparative Example 6

Thermoplastic resin A and thermoplastic resin B were prepared as the two types of thermoplastic resins. Polyethylene terephthalate (PET) having an inherent viscosity of 0.65 [F20S made by Toray Industries, Inc.] was used as thermoplastic resin A. In addition, thermoplastic resin B of Comparative Example 2 was used as thermoplastic resin B. These thermoplastic resins A and B were respectively supplied to an extruder after drying.

Thermoplastic resins A and B were respectively in a melted state at 280° C. in the extruder and flowed through gear pumps and filters, and after that, merged together in a feed block for 801 layers in the same manner as in Example 3. Here, the form of the slits was changed so that the length became 25 mm (long side in the figure) and (the slit area on the side to which resin is not introduced)/(the slit area on the side to which resin is introduced) became 0.95. The thickness of the respective layers of thermoplastic resins A and B that merged together varied so as to be gradually larger in linear form from one surface side to the opposite surface side (slope type) within the feed block, and 401 layers of thermoplastic resin A and 400 layers of thermoplastic resin B are alternately layered in the direction of the thickness of the structure. The thickness of each layer was adjusted by adjusting the form of a microscopic slit (formed with a process precision of 0.01 mm) which is provided within the feed block. Here, the two surface layer portions were made of thermoplastic resin A. Here, the form of the feed block and the amount of discharge were adjusted so that the thickness ratio Z of layer A to layer B became 0.95. Thus gained multilayer body having 801 layers in total was supplied to a multi manifold die and additional layers made of thermoplastic resin A that was supplied from another extruder were formed as the surface layers thereof so as to be molded in sheet form, and after that, was quenched and solidified on a casting drum where the surface temperature was maintained at 25° C. through the application of static electricity.

A corona discharging process was carried out on the two surfaces of the gained cast film in the air so that wet tension of the base film became 55 mN/m and a coating liquid for forming multilayer film made of (a polyester resin having a glass transition temperature of 18° C.)/(a polyester resin having a glass transition temperature of 82° C.)/silica particles having an average particle diameter of 100 nm was applied to the processed surfaces of the base film, and thus, transparent/smooth/adhesive layers were formed. This cast film was led into a simultaneous biaxial expander in a linear motor system so as to be heated in advance with a hot wind of 95° C., and after that, expanded 3.5 times in the longitudinal direction and in the direction of the width. The expanded film was left in this state within the tenter where heat treatment was carried out with a hot wind of 230° C., and at the same time a relaxing process of 2% was carried out in the longitudinal direction, and subsequently, a relaxing process of 5% was carried out in the direction of the width, and then the film was gradually cooled to room temperature, and after that, rolled up. The thickness of the gained film was 128 μm. The resulting film is shown in Table 4. The gained film reflected near infrared rays without unevenness. In addition, when a hard coat layer and a reflection preventing layer were provided on one surface, unevenness in the interference caused almost no problem.

An optical filter was formed using this film, in the same manner as in Example 24. A test for resistance to heat over a long period of time, which is required for PDP filters (80° C., 500 hours), was carried out on this optical filter. As a result, it was found that the transmissivity of near infrared rays (900 nm) was 60% after the test, as compared to 75% before the test. Therefore, the change in the performance over time was too great for near infrared ray cut films for a PDP, and thus, the film was impossible to use. In addition, the difference in the reflectance in the direction of the width was great, and the film having a large area caused a problem of leakage of near infrared rays.

Comparative Example 7

Thermoplastic resin A and thermoplastic resin B were prepared as the two types of thermoplastic resins. Polyethylene naphthalate (PEN) having an inherent viscosity of 0.7 was used as thermoplastic resin A. In addition, polymethyl methacrylate (PMMA) was used as thermoplastic resin B. These thermoplastic resins A and B were respectively supplied to an extruder after drying. Here, this thermoplastic resin A was a crystalline resin and this thermoplastic resin B was an amorphous resin, and these do not share the same basic skeleton.

Thermoplastic resins A and B were respectively in a melted state at 280° C. in the extruder and flowed through gear pumps and filters, and after that, merged together in a feed block for 801 layers in the same manner as in Example 3. The thickness of the respective layers of thermoplastic resins A and B that merged together varied so as to be gradually larger in linear form from one surface side to the opposite surface side (slope type) within the feed block, and 401 layers of thermoplastic resin A and 400 layers of thermoplastic resin B are alternately layered in the direction of the thickness of the structure. The thickness of each layer was adjusted by adjusting the form of a microscopic slit (formed with a process precision of 0.01 mm) which is provided within the feed block. In addition, as for the form of the slits, the length became 50 mm (long side in the figure) and (the slit area on the side to which resin is not introduced)/(the slit area on the side to which resin is introduced) became 0.5. Here, the two surface layer portions were made of thermoplastic resin A. Here, the form of the feed block and the amount of discharge were adjusted so that the thickness ratio Z of layer A to layer B became 1. Thus gained multilayer body having 801 layers in total was supplied to a multi manifold die and additional layers made of thermoplastic resin A that was supplied from another extruder were formed as the surface layers thereof so as to be molded in sheet form, and after that, was quenched and solidified on a casting drum where the surface temperature was maintained at 25° C. through the application of static electricity.

A corona discharging process was carried out on the two surfaces of the gained cast film in the air so that wet tension of the base film became 55 mN/m and a coating liquid for forming multilayer film made of (a polyester resin having a glass transition temperature of 18° C.)/(a polyester resin having a glass transition temperature of 82° C.)/silica particles having an average particle diameter of 100 nm was applied to the processed surfaces of the base film, and thus, transparent/smooth/adhesive layers were formed. This cast film was led into a simultaneous biaxial expander in a linear motor system so as to be heated in advance with a hot wind of 135° C., and after that, expanded 5.5 times in the longitudinal direction and in the direction of the width. The expanded film was left in this state within the tenter where heat treatment was carried out with a hot wind of 230° C., and at the same time a relaxing process of 2% was carried out in the longitudinal direction, and subsequently, a relaxing process of 5% was carried out in the direction of the width, and then the film was gradually cooled to room temperature, and after that, rolled up. The thickness of the gained film was 128 μm. Though the gained film reflected near infrared rays without unevenness, the number of peeled grids was 25 in the peeling test, and thus, the adhesiveness between the layers was significantly poor.

TABLE 1

|  |  | Example 1 | Example 2 | Example 3 | Example 4 |
|---|---|---|---|---|---|
| Layer structure | Thermoplastic resin A | PET | PET | PET | PET |
|  | Thermoplastic resin B | CHDM copolymerized PET + PET | CHDM copolymerized PET + PET | CHDM copolymerized PET + PET | CHDM copolymerized PET + PET |
|  | Number of layers | 203 | 53 | 803 | 203 |
|  | Thickness ratio of layer A to adjacent layer B | 0.95 | 0.95 | 0.95 | 1.89 |
| Optical properties before heating | Reflectance at peak of reflection R1 (%) | 93 | 57 | 92 | 94 |
|  | Wavelength at peak of reflection (nm) | 678 | 678 | 900-1050 | 1530 |
|  | Reflectance in secondary reflection band (%) | 11 | 11 | 11 | 82 |
|  | Wavelength in secondary reflection band (nm) | 339 | 339 | 450-525 | 765 |
|  | Reflectance in tertiary reflection band (%) | Undetectable | Undetectable | 73 | 11 |
|  | Wavelength in tertiary reflection band (nm) | Undetectable | Undetectable | 300-350 | 510 |
|  | Reflectance in quaternary reflection band (%) | Undetectable | Undetectable | Undetectable | 83 |
|  | Wavelength in quaternary reflection band (nm) | Undetectable | Undetectable | Undetectable | 383 |
|  | Difference in reflectance in direction of width (%) | 10 | 8 | 7 | 8 |
| Optical properties after heating | Reflectance at peak of reflection R2 (%) | 90 | 56 | 92 | 91 |
|  | R1 − R2 (%) | 3 | 1 | 0 | 3 |
| Detachment test | Number of detached lattices | 0 | 0 | 0 | 0 |
| Amount of heat at peak of heat emission | (J/g) | 0 | 0 | 0 | 0 |
|  | Squared value of correlation coefficient in linear approximation | 0.22 | 0.31 | 0.55 | 0.19 |
|  | Squared value of correlation coefficient in quadratic polynomial approximation | 0.25 | 0.35 | 0.58 | 0.21 |
|  | Unevenness in layers (%) | 6 | 5 | 18 | 5 |
| Ratio of thermal contraction | Longitudinal direction (%) | 0.2 | 0.5 | 0.2 | 0.2 |
|  | Direction of width (%) | 0.2 | 0.3 | 0.2 | 0.2 |

TABLE 2

|  |  | Example 5 | Example 6 | Example 7 | Example 8 |
|---|---|---|---|---|---|
| Layer structure | Thermoplastic resin A | PET | PET | PET | PET |
|  | Thermoplastic resin B | CHDM copolymerized PET + PET | Adipic acid · CHDM copolymerized PET | CHDM copolymerized PET | CHDM copolymerized PET |
|  | Number of layers | 203 | 203 | 203 | 203 |
|  | Thickness ratio of layer A to adjacent layer B | 3.2 | 0.95 | 1.89 | 1.89 |
| Optical properties before heating | Reflectance at peak of reflection R1 (%) | 94 | 98 | 91 | 95 |
|  | Wavelength at peak of reflection (nm) | 1531 | 677 | 1530 | 1530 |
|  | Reflectance in secondary reflection band (%) | 82 | 10 | 81 | 82 |
|  | Wavelength in secondary reflection band (nm) | 766 | 338 | 765 | 765 |
|  | Reflectance in tertiary reflection band (%) | 78 | 88 | 12 | 11 |
|  | Wavelength in tertiary reflection band (nm) | 510 | 223 | 510 | 510 |
|  | Reflectance in quaternary reflection band (%) | 66 | Undetectable | 81 | 70 |
|  | Wavelength in quaternary reflection band (nm) | 383 | Undetectable | 383 | 383 |
|  | Difference in reflectance in direction of width (%) | 10 | 5 | 23 | 2 |
| Optical properties after heating | Reflectance at peak of reflection R2 (%) | 91 | 95 | 85 | 90 |
|  | R1 − R2 (%) | 3 | 3 | 6 | 5 |
| Detachment test | Number of detached lattices | 0 | 2 | 0 | 0 |
| Amount heat at peak of heat emission | (J/g) | 0 | 5 | 0 | 0 |
|  | Squared value of correlation coefficient in linear approximation | 0.17 | 0.22 | 0.19 | 0.19 |
|  | Squared value of correlation coefficient in quadratic polynomial approximation | 0.19 | 0.25 | 0.21 | 0.21 |
|  | Unevenness in layers (%) | 4 | 6 | 14 | 5 |
| Ratio of thermal contraction | Longitudinal direction (%) | 0.2 | 0.2 | 1.4 | 0.2 |
|  | Direction of width (%) | 0.2 | 0.2 | 0.3 | 0.2 |

TABLE 3

|  |  | Comparative Example 1 | Comparative Example 2 | Comparative Example 3 | Comparative Example 9 |
|---|---|---|---|---|---|
| Layer structure | Thermoplastic resin A | PET | PET | PET | PET |
|  | Thermoplastic resin B | Isophthalic acid copolymerized PET | Isophthalic acid copolymerized PET | CHDM copolymerized PET + PET | CHDM copolymerized PET + PET |
|  | Number of layers | 203 | 203 | 131 | 203 |
|  | Thickness ratio of layer A to adjacent layer B | 0.95 | 0.95 | 0.95 | 0.95 |

TABLE 3-continued

|  |  | Comparative Example 1 | Comparative Example 2 | Comparative Example 3 | Comparative Example 9 |
|---|---|---|---|---|---|
| Optical properties before heating | Reflectance at peak of reflection R1 (%) | 71 | 80 | (25) | 95 |
|  | Wavelength at peak of reflection (nm) | 678 | 680 | 560 | 535 |
|  | Reflectance in secondary reflection band (%) | 11 | 11 | 20 | Undetectable |
|  | Wavelength in secondary reflection band (nm) | 339 | 340 | 280 | Undetectable |
|  | Reflectance in tertiary reflection band (%) | Undetectable | Undetectable | Undetectable | Undetectable |
|  | Wavelength in tertiary reflection band (nm) | Undetectable | Undetectable | Undetectable | Undetectable |
|  | Reflectance in quaternary reflection band (%) | Undetectable | Undetectable | Undetectable | Undetectable |
|  | Wavelength in quaternary reflection band (nm) | Undetectable | Undetectable | Undetectable | Undetectable |
|  | Difference in reflectance in direction of width (%) | 8 | 7 | 10 | 10 |
| Optical properties after heating | Reflectance at peak of reflection R2 (%) | 43 | 55 | (−27) | 89 |
|  | R1 − R2 (%) | 28 | 25 | — | 6 |
| Detachment test | Number of detached lattices | 4 | 6 | 0 | 0 |
| Amount of heat at peak of heat emission | (J/g) | 5.1 | 12 | 0 | 0 |
|  | Squared value of correlation coefficient in linear approximation | 0.21 | 0.21 | 0.09 | 0.22 |
|  | Squared value of correlation coefficient in quadratic polynomial approximation | 0.24 | 0.24 | 0.1 | 0.24 |
|  | Unevenness in layers (%) | 6 | 6 | 60 | 4 |
| Ratio of thermal contraction | Longitudinal direction (%) | 0.2 | 0.2 | 0.2 | 0.2 |
|  | Direction of width (%) | 0.2 | 0.2 | 0.2 | 0.2 |
| Film thickness | Average thickness (μm) | 21.1 | 21.1 | — | 15.5 |
|  | Ratio of variation in thickness (%) | 1.6 | 1.4 | — | 15 |
|  | Wave number (1/m) | 1.2 | 1.2 | — | 20 |
|  | Pw | 0.03 | 0.02 | — | 0.75 |

TABLE 4

| Item | Unit | Example 10 | Example 11 | Example 12 | Comparative Example 4 |
|---|---|---|---|---|---|
| Layers A | — | PET | PET | PET | PET |
| Layers B | — | PE/CHDM · T | PE/CHDM · T | PE/CHDM · T | PET/A |
| Number of layers | — | 803 | 803 | 803 | 803 |
| Film thickness | μm | 128 | 130 | 128 | 128 |
| Thickness ratio Z of layer A to adjacent layer B | — | 1 | 0.95 | 3.5 | 1 |
| Low wavelength end λ1 | nm | 820 | 840 | 800 | 820 |
| Low wavelength end λ2 | nm | 1100 | 1125 | 1060 | 1100 |
| XA1 | nm | 128 | 128 | 194 | 128 |
| XA2 | nm | 172 | 171 | 258 | 172 |
| XB1 | nm | 128 | 135 | 56 | 128 |
| XB2 | nm | 172 | 180 | 74 | 172 |
| Number of layers A having thickness of XA1 to XA2 | Layers | 396 | 398 | 401 | 396 |
| Number of layers B having thickness of XB1 to XB2 | Layers | 395 | 397 | 397 | 395 |
| Profile in layer thickness | — | Sloping type | Sloping type | Sloping type | Sloping type |
| Structure of surface layer(outermost layer) | (Structure) | Polyester based adhesive layer | Polyester based adhesive layer | Polyester based adhesive layer | Polyester based adhesive layer |
|  | nm | 50 | 50 | 50 | 50 |
| Structure of surface layer(second layer) | (Structure) | PET layer | PET layer | PET layer | PET layer |
|  | μm | 5 | 5 | 5 | 5 |
| Reflectance at peak of reflection (R1) | % | 101 | 102 | 78 | 103 |
| Range of reflectance within peak of reflection | % | 8 | 8 | 8 | 5 |
| Difference in reflectance in direction of width | % | 3 | 2 | 3 | 2 |
| Reflectance at peak at reflection after heating (R2) | % | 96 | 95 | 72 | 80 |
| R1 − R2 | % | 5 | 7 | 6 | 23 |
| Detachment test | Number of detached lattices | 1 | 1 | 1 | 6 |
| Squared value of correlation coefficient in linear approximation |  | 0.71 | 0.71 | 0.77 | 0.7 |
| Squared value of correlation coefficient in quadratic polynomial approximation |  | 0.72 | 0.72 | 0.77 | 0.72 |
| Unevenness in layers (%) |  | 12 | 12 | 12 | 12 |
| Reflectance in secondary reflective band (%) |  | 14 | 11 | 70 | 15 |
| Difference in reflectance in direction of width of secondary reflective band (%) |  | 5 | 2 | 5 | 5 |
| DSC (amount of heat at peak of heat emission) | J/g | 0 | 0 | 0 | 18 |
| Number of scratches | Number | 3 | 3 | 5 | 3 |
| Expansion system | — | Simultaneous biaxial expansion | Simultaneous biaxial expansion | Simultaneous biaxial expansion | Simultaneous biaxial expansion |

TABLE 5

| Item | Unit | Example 10 | Example 14 | Example 15 | Example 16 |
|---|---|---|---|---|---|
| Layers A | — | PET | PET | PET | PET |
| Layers B | — | CHDM copolymerized PET + PET | CHDM copolymerized PET + PET | CHDM copolymerized PET + PET | CHDM copolymerized PET + PET |
| Number of layers | — | 803 | 803 | 803 | 803 |
| Film thickness | μm | 128 | 128 | 118 | 138 |
| Thickness ratio Z of layer A to adjacent layer B | — | 0.95 | 0.95 | 0.95 | 0.95 |
| Low wavelength end $\lambda 1$ | nm | 820 | 820 | 800 | 850 |
| Low wavelength end $\lambda 2$ | nm | 1100 | 1100 | 1100 | 1140 |
| XA1 | nm | 125 | 125 | 122 | 129 |
| XA2 | nm | 167 | 167 | 167 | 174 |
| XB1 | nm | 131 | 131 | 128 | 136 |
| XB2 | nm | 176 | 176 | 176 | 183 |
| Number of layers A having thickness of XA1 to XA2 | Layers | 395 | 396 | 360 | 379 |
| Number of layers B having thickness of XB1 to XB2 | Layers | 396 | 395 | 357 | 378 |
| Profile in layer thickness | — | Sloping type | Sloping type | Sloping type | Sloping type |
| Structure of surface layer(outermost layer) | (Structure) | PET + aspherical silica layer | Polyester based adhesive layer | Polyester based adhesive layer | Polyester based adhesive layer |
|  | nm | 5000 | 50 | 50 | 50 |
| Structure of surface layer(second layer) | (Structure) | — | PET layer | — | PET layer |
|  | μm | — | 5 | — | 5 |
| Reflectance at peak of reflection (R1) | % | 102 | 103 | 95 | 100 |
| Range of reflectance within peak of reflection | % | 5 | 5 | 15 | 12 |
| Difference in reflectance in direction of width | % | 3 | 5 | 5 | 3 |
| Reflectance at peak of reflection after heating (R2) | % | 97 | 99 | 92 | 96 |
| R1 − R2 | % | 5 | 4 | 3 | 4 |
| Detachment test | Number of detached lattices | 0 | 0 | 0 | 0 |
| Squared value of correlation coefficient in linear approximation |  | 0.71 | 0.71 | 0.6 | 0.39 |
| Squared value of correlation coefficient in quadratic polynomial approximation |  | 0.72 | 0.72 | 0.7 | 0.75 |
| Unevenness in layers (%) |  | 12 | 12 | 13 | 16 |
| Reflectance in secondary reflective band (%) |  | 11 | 12 | 12 | 11 |
| Difference in reflectance in direction of width of secondary reflective band (%) |  | 2 | 4 | 4 | 2 |
| DSC (amount of heat at peak of heat emission) | J/g | 0 | 0 | 0 | 0 |
| Number of scratches | Number | 3 | 14 | 30 | 5 |
| Expansion system | — | Simultaneous biaxial expansion | Consecutive biaxial | Consecutive biaxial | Simultaneous biaxial expansion |

TABLE 6

| Item | Unit | Example 17 | Example 18 | Example 19 | Example 20 |
|---|---|---|---|---|---|
| Layers A | — | PET | PET + spherical silica | PET | PET |
| Layers B | — | CHDM copolymerized PET + PET | CHDM copolymerized PET + PET | CHDM copolymerized PET + PET | CHDM copolymerized PET + PET |
| Number of layers | — | 803 | 801 | 403 | 203 |
| Film thickness | μm | 128 | 128 | 71 | 41 |
| Thickness ratio Z of layer A to adjacent layer B | — | 0.95 | 0.95 | 0.95 | 0.95 |
| Low wavelength end $\lambda 1$ | nm | 850 | 820 | 850 | 850 |
| Low wavelength end $\lambda 2$ | nm | 1160 | 1100 | 1150 | 1150 |
| XA1 | nm | 129 | 125 | 129 | 129 |
| XA2 | nm | 177 | 167 | 175 | 175 |
| XB1 | nm | 136 | 131 | 136 | 136 |
| XB2 | nm | 186 | 176 | 184 | 184 |
| Number of layers A having thickness of XA1 to XA2 | Layers | 399 | 375 | 190 | 96 |
| Number of layers B having thickness of XB1 to XB2 | Layers | 399 | 370 | 187 | 95 |
| Profile in layer thickness | — | Recess type | Sloping type | Sloping type | Sloping type |
| Structure of surface layer(outermost layer) | (Structure) | Polyester based adhesive layer | — | Polyester based adhesive layer | Polyester based adhesive layer |
|  | nm | 50 | — | 50 | 50 |
| Structure of surface layer(second layer) | (Structure) | PET layer | — | PET layer | PET layer |
|  | μm | 5 | — | 5 | 5 |
| Reflectance at peak of reflection (R1) | % | 100 | 98 | 81 | 59 |
| Range of reflectance within peak of reflection | % | 11 | 11 | 21 | 25 |
| Difference in reflectance in direction of width | % | 3 | 2 | 2 | 8 |
| Reflectance at peak of reflection after heating (R2) | % | 97 | 93 | 79 | 50 |
| R1 − R2 | % | 3 | 5 | 2 | 9 |
| Detachment test | Number of detached lattices | 0 | 0 | 0 | 0 |
| Squared value of correlation coefficient in linear approximation |  | 0.39 | 0.6 | 0.7 | 0.3 |
| Squared value of correlation coefficient in quadratic polynomial approximation |  | 0.75 | 0.7 | 0.72 | 0.32 |
| Unevenness in layers (%) |  | 16 | 13 | 14 | 4 |

TABLE 6-continued

| Item | Unit | Example 17 | Example 18 | Example 19 | Example 20 |
|---|---|---|---|---|---|
| Reflectance in secondary reflective band (%) | | 11 | 12 | 11 | 11 |
| Difference in reflectance in direction of width of secondary reflective band (%) | | 2 | 4 | 2 | 2 |
| DSC (amount of heat at peak of heat emission) | J/g | 0 | 0 | 0 | 0 |
| Number of scratches | Number | 4 | 3 | 5 | 4 |
| Expansion system | — | Simultaneous biaxial expansion | Simultaneous biaxial expansion | Simultaneous biaxial expansion | Simultaneous biaxial expansion |

TABLE 7

| Item | Unit | Example 21 | Example 22 | Example 23 | Comparative Example 6 |
|---|---|---|---|---|---|
| Layers A | — | PET | PET | PET | PET |
| Layers B | — | CHDM copolymerized PET + PET | CHDM copolymerized PET + PET | CHDM copolymerized PET + PET | PET/I |
| Number of layers | — | 403 | 803 | 1603 | 803 |
| Film thickness | μm | 85 | 150 | 225 | 128 |
| Thickness ratio Z of layer A to adjacent layer B | — | 1 | 1 | 2 | 1 |
| Low wavelength end λ1 | nm | 800 | 600 | 390 | 820 |
| Low wavelength end λ2 | nm | 1650 | 1650 | 1250 | 1100 |
| XA1 | nm | 125 | 94 | 81 | 128 |
| XA2 | nm | 258 | 258 | 260 | 172 |
| XB1 | nm | 125 | 94 | 41 | 128 |
| XB2 | nm | 258 | 258 | 130 | 172 |
| Number of layers A having thickness of XA1 to XA2 | Layers | 199 | 360 | 401 | 396 |
| Number of layers B having thickness of XB1 to XB2 | Layers | 198 | 350 | 400 | 395 |
| Profile in layer thickness | — | Sloping type | Sloping type | Sloping type | Sloping type |
| Structure of surface layer(outermost layer) | (Structure) | PET + spherical silica layer | Polyester based adhesive layer | Polyester based adhesive layer | Polyester based adhesive layer |
| | nm | 50 | 50 | 50 | 50 |
| Structure of surface layer(second layer) | (Structure) | PET layer | PET layer | PET layer | PET layer |
| | μm | 5 | 5 | 5 | 5 |
| Reflectance at peak of reflection (R1) | % | 55 | 71 | 104 | 83 |
| Range of reflectance within peak of reflection | % | 30 | 41 | 3 | 16 |
| Difference in reflectance in direction of width | % | 5 | 5 | 3 | 21 |
| Reflectance at peak of reflection after heating (R2) | % | 47 | 63 | 98 | 64 |
| R1 – R2 | % | 8 | 8 | 6 | 19 |
| Detachment test | Number of detached lattices | 0 | 0 | 0 | 4 |
| Squared value of correlation coefficient in linear approximation | | 0.91 | 0.95 | 0.87 | 0.4 |
| Squared value of correlation coefficient in quadratic polynomial approximation | | 0.92 | 0.95 | 0.87 | 0.41 |
| Unevenness in layers (%) | | 25 | 28 | 30 | 21 |
| Reflectance in secondary reflective band (%) | | 14 | — | — | 18 |
| Difference in reflectance in direction of width of secondary reflective band (%) | | 5 | — | — | 11 |
| DSC (amount of heat at peak of heat emission) | J/g | 0 | 0 | 0 | 0 |
| Number of scratches | Number | 18 | 20 | 3 | 3 |
| Expansion system | — | Consecutive biaxial | Consecutive biaxial | Simultaneous biaxial expansion | Simultaneous biaxial expansion |

INDUSTRIAL APPLICABILITY

The present invention relates to a multilayer film.

In particular, the invention relates to a multilayer film which is appropriate for decorative materials used for construction materials, wrapping, the interior and exterior of automobiles, materials for preventing counterfeiting, such as holograms, a variety of displays, such as liquid crystal displays, plasma displays, field emission displays and organic electronic displays, reflective materials for optical filters of a variety of optical apparatuses, such as optical printing apparatuses and cameras, heat ray blocking window films for cars and construction materials, reflectors for solar batteries and the like.

The invention claimed is:

1. A multilayer film, comprising a structure where five or more layers made of thermoplastic resin A (layers A) and five or more layers made of thermoplastic resin B (layers B) having a basic skeleton that is the same as that of thermoplastic resin A are alternately layered on top of each other, wherein at least one reflection peak is provided and the difference between the reflectance of the reflection peak before heating and after heating for 30 minutes in an atmosphere of 150° C. is no greater than 15%, wherein the total number of layers A and layers B is no less than 640, and wherein the difference in reflectance between the peaks of reflection in different locations in the direction of the width of the film is within ±10%, and wherein the multilayer film is manufactured by using a feedblock which separately includes at least two or more members having a number of microscopic slits, and wherein thermoplastic resin A is polyethylene terephthalate and thermoplastic resin B is a resin formed from polyethylene terephthalate and copolymerized cyclohexane dimethanol such that the polyethylene terephthalate is compounded at a ratio of 50:50 to 99:1 in the resin.

2. The multilayer film according to claim 1, wherein the squared value of the correlation coefficient when each order number of layers B from one of the surface layers of the film and the thickness of the layer are linearly approximated is no less than 0.4 and no greater than 1.

3. The multilayer film according to claim 1, wherein the squared value of the correlation coefficient when each order number of layers B from one of the surface layers of the film and the thickness of the layer are approximated in a quadratic polynomial is no less than 0.4 and no greater than 1.

4. The multilayer film according to claim 1, wherein the layer unevenness M in layers B which is found in the following form is no greater than 20%:

$$M = s/a \times 100$$

where M is the layer unevenness in layers B (%), s is the standard deviation for layers B (nm) and a is the average thickness of layers B (nm).

5. The multilayer film according to claim 1, wherein the thickness (nm) of at least one layer from among the layers A that form the film is within a range from XA1 to XA2 shown in the following formula and the number of layers A which are included in this range is no less than $50 \times (XA2/XA1)^2$ when the ratio in the thickness of a layer A to an adjacent layer B (thickness of layer A/thickness of layer B) is Z, the lowest wavelength end is $\lambda 1$ and the highest wavelength end is $\lambda 2$ in the reflection peak on the highest wavelength side where the reflectance is no less than 30%:

$$XA1 = \lambda 1/(3.2 \times (1+Z)) \text{ and } XA2 = \lambda 2/(3.2 \times (1+Z)).$$

6. The multilayer film according to claim 1, wherein said film has a reflection peak of which the reflectance is no less than 80%.

7. The multilayer film according to claim 1, wherein the thicknesses of layers B (nm) at least include a thickness in the range from XB1 to XB2 shown in the following formula and the number of layers B which are included in this range is no less than $50 \times (XB2/XB1)^2$:

$$XB1 = Z \times XA1$$

$$XB2 = Z \times XA2$$

wherein the thickness (nm) of at least one layer from among the layers A that form the film is within a range from XA1 to XA2 shown in the following formula, wherein the ratio in the thickness of a layer A to an adjacent layer B (thickness of layer A/thickness of layer B) is Z, the lowest wavelength end is $\lambda 1$ and the highest wavelength end is $\lambda 2$ in the reflection peak on the highest wavelength side where the reflectance is no less than 30%:

$$XA1 = \lambda 1/(3.2 \times (1+Z)) \text{ and } XA2 = \lambda 2/(3.2 \times (1+Z)).$$

8. The multilayer film according to claim 1, wherein said film has a portion where the thicknesses of layers A and/or the thicknesses of layers B gradually change from XA1 to XA2 and/or gradually change from XB1 to XB2 from the surface side of the film toward the opposite surface side.

9. The multilayer film according to claim 1, wherein the thicknesses of layers A and/or the thicknesses of layers B change from the surface side of the film toward the opposite surface side in such a manner that the thickness is essentially smaller on the surface side and the thickness is greater close to the center portion in the cross section of the film.

10. The multilayer film according to claim 1, wherein the thicknesses of layers A and/or the thicknesses of layers B change from the surface side of the film toward the opposite surface side in such a manner that the thickness is essentially greater on the surface side and the thickness is smaller close to the center portion in the cross section of the film.

11. The multilayer film according to claim 1, wherein thickness ratio Z of a layer A to an adjacent layer B is no less than 0.8 and no greater than 5.

12. The multilayer film according to claim 1, wherein said film has at least one high order reflective band of which the reflectance is no greater than 30%.

13. The multilayer film according to claim 12, wherein the order of the high order reflective band of which the reflectance is no greater than 30% is secondary or lower and quaternary or higher.

14. The multilayer film according to claim 1, wherein the difference in reflectance between secondary reflective bands in different locations in the direction of the width of the film is within ±5%.

15. The multilayer film according to claim 1, wherein the thermoplastic resin is polyester and either thermoplastic resin A or thermoplastic resin B includes a polyester with which at least aliphatic dicarboxylic acid is copolymerized.

16. The multilayer film according to claim 1, wherein the peak of heat emission is no less than 0 J/g and no greater than 5 J/g in DSC measurement (first heating).

17. The multilayer film according to claim 1, wherein said film has a layer of which the thickness is no less than 3 µm and of which the main component is polyethylene terephthalate on at least one side.

18. The multilayer film according to claim 1, wherein said film has a layer made of an adhesive layer of which the thickness is no less than 30 nm and no greater than 300 nm, and a polyethylene terephthalate layer of which the thickness is no less than 3 µm on at least one side.

19. The multilayer film according to claim 1, wherein layers other than the outermost layers essentially do not include particles of which the average particle diameter is no less than 20 nm and no greater than 20 µm.

20. The multilayer film according to claim 1, wherein the number of scratches of which the width is no less than 20 µm is no greater than 20/m².

21. The multilayer film according to claim 1, wherein the thickness of the multilayer film periodically varies in the longitudinal direction or direction of the width of the film.

22. The multilayer film according to claim 1, wherein color development in the multilayer film periodically changes within the surface.

23. The multilayer film according to claim 1, wherein one or more peaks of which the intensity is 0.04 to 25 in the wave number of 0.5 to 100000 (1/m) in the spectrum when the fluctuation in the thickness of the film is Fourier analyzed.

24. A decorative film containing the multilayer film according to claim 1.

25. An anti-counterfeit film containing the multilayer film according to claim 1.

26. An optical filter containing the multilayer film according to claim 1.

27. A hologram containing the multilayer film according to claim 1.

28. A filter for PDP containing the multilayer film according to claim 1.

29. A reflector for a solar battery, wherein said reflector is made of the multilayer film according to claim 1.

30. The reflector for a solar battery according to claim 29, wherein said reflector has a reflective band of which the reflectance is no less than 80% in a range from 300 nm to 2500 nm.

31. The reflector for a solar battery according to claim 29, wherein the vapor transmissivity is no greater than 2 g/(m$^2$·day).

32. The reflector for a solar battery according to claim 29, wherein resistance to hydrolysis is no less than 1000 hours at 85° C. with a humidity of 85%.

33. The reflector for a solar battery according to claim 29, wherein said reflector is made of a multilayer film of which the strength against tearing is no less than 6 N/mm in the longitudinal and the direction of the width.

34. The reflector for a solar battery according to claim 29, wherein said reflector has an absorption band in a wavelength of no greater than 400 nm.

* * * * *